US011226688B1

(12) United States Patent
Glaser et al.

(10) Patent No.: US 11,226,688 B1
(45) Date of Patent: Jan. 18, 2022

(54) SYSTEM AND METHOD FOR HUMAN GESTURE PROCESSING FROM VIDEO INPUT

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 0 days.

(21) Appl. No.: 16/912,080

(22) Filed: Jun. 25, 2020

Related U.S. Application Data

(63) Continuation of application No. 16/132,163, filed on Sep. 14, 2018, now abandoned.

(60) Provisional application No. 62/558,731, filed on Sep. 14, 2017.

(51) Int. Cl.
| | |
|---|---|
| *G06F 3/01* | (2006.01) |
| *G06F 3/16* | (2006.01) |
| *G06K 9/00* | (2006.01) |
| *G06Q 30/06* | (2012.01) |
| *G06F 3/0346* | (2013.01) |

(52) U.S. Cl.
CPC ............ *G06F 3/017* (2013.01); *G06F 3/0346* (2013.01); *G06F 3/167* (2013.01); *G06K 9/00335* (2013.01); *G06K 9/00355* (2013.01); *G06K 9/00369* (2013.01); *G06K 9/00771* (2013.01); *G06Q 30/0633* (2013.01)

(58) Field of Classification Search
CPC ........ G06F 3/017; G06F 3/0346; G06F 3/167; G06K 9/00369; G06K 9/00355; G06K 9/00771; G06K 9/00335; G06Q 30/0633
See application file for complete search history.

(56) References Cited

U.S. PATENT DOCUMENTS

| | | |
|---|---|---|
| 5,254,853 A | 10/1993 | Reich |
| 5,418,567 A | 5/1995 | Boers et al. |
| 5,502,564 A | 3/1996 | Ledger |

(Continued)

FOREIGN PATENT DOCUMENTS

| | | |
|---|---|---|
| BR | 102016019151 A2 | 3/2018 |
| WO | 2019032304 A1 | 2/2019 |

OTHER PUBLICATIONS

Elizabeth Weise: "How Amazon's line-less grocery services might really work", USATODAY, Dec. 8, 2016 (Dec. 8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020] *the whole document*.

*Primary Examiner* — Amy Onyekaba
(74) *Attorney, Agent, or Firm* — Alpine Patents LLC; Brian Van Osdol

(57) ABSTRACT

A system and method for an associative interaction framework used for user input within an interaction platform used in an environment that includes collecting image data in the environment; through computer vision analysis of the image data, classifying objects in the environment wherein a plurality of the objects are detected users; for at least one user, detecting an associative interaction event, which includes: through computer vision analysis of the image data, detecting a first object association of the one user with a first object, and initiating an associative interaction event with a set of interaction properties including properties of the user and the first object association; and executing an action response based on the associative interaction event.

19 Claims, 11 Drawing Sheets

(56) References Cited

U.S. PATENT DOCUMENTS

| | | |
|---|---|---|
| 6,970,183 B1 | 11/2005 | Monroe |
| 6,996,460 B1 | 2/2006 | Krahnstoever et al. |
| 7,053,915 B1 | 5/2006 | Jung et al. |
| 7,195,157 B2 | 3/2007 | Swartz et al. |
| 7,225,414 B1* | 5/2007 | Sharma ............... G06F 3/012 715/862 |
| 7,227,976 B1 | 6/2007 | Jung et al. |
| 7,274,803 B1 | 9/2007 | Sharma et al. |
| 7,283,650 B1* | 10/2007 | Sharma ............... G06Q 30/02 358/1.14 |
| 7,319,779 B1 | 1/2008 | Mummareddy et al. |
| 7,505,621 B1 | 3/2009 | Agrawal et al. |
| 7,590,261 B1 | 9/2009 | Mariano et al. |
| 7,711,155 B1 | 5/2010 | Sharma et al. |
| 7,734,070 B1 | 6/2010 | Sharma et al. |
| 7,848,548 B1 | 12/2010 | Moon et al. |
| 7,881,822 B2* | 2/2011 | Thornton ............ G07F 9/026 700/244 |
| 7,911,482 B1* | 3/2011 | Mariano ............. G11B 27/34 345/676 |
| 7,912,246 B1 | 3/2011 | Moon et al. |
| 7,921,036 B1 | 4/2011 | Sharma et al. |
| 7,930,204 B1* | 4/2011 | Sharma ............ G06Q 30/0203 705/7.32 |
| 7,957,565 B1* | 6/2011 | Sharma ............ G06K 9/00778 382/115 |
| 7,961,174 B1* | 6/2011 | Markovic ........... G06F 3/017 345/158 |
| 7,974,869 B1* | 7/2011 | Sharma ............... G06Q 30/02 705/7.31 |
| 7,987,111 B1 | 7/2011 | Sharma et al. |
| 8,009,863 B1* | 8/2011 | Sharma ............ G06K 9/00335 382/100 |
| 8,010,402 B1* | 8/2011 | Sharma ............... G06Q 10/00 705/7.29 |
| 8,027,521 B1 | 9/2011 | Moon et al. |
| 8,098,888 B1* | 1/2012 | Mummareddy ... G06K 9/00778 382/103 |
| 8,189,926 B2* | 5/2012 | Sharma ............ G06K 9/00771 382/224 |
| 8,219,438 B1 | 7/2012 | Moon et al. |
| 8,254,633 B1* | 8/2012 | Moon ............... G06K 9/00771 382/103 |
| 8,295,597 B1* | 10/2012 | Sharma ............... G06T 7/20 382/173 |
| 8,325,982 B1* | 12/2012 | Moon ............... G06K 9/3233 382/103 |
| 8,334,842 B2* | 12/2012 | Markovic ........... G06F 3/017 345/158 |
| 8,351,647 B2* | 1/2013 | Sharma ............... G06Q 30/02 382/103 |
| 8,379,937 B1 | 2/2013 | Moon et al. |
| 8,380,558 B1* | 2/2013 | Sharma ............... G06Q 30/02 705/7.29 |
| 8,396,758 B2 | 3/2013 | Paradise et al. |
| 8,412,656 B1 | 4/2013 | Baboo et al. |
| 8,433,612 B1* | 4/2013 | Sharma ............... G06Q 30/06 705/14.41 |
| 8,448,859 B2 | 5/2013 | Goncalves et al. |
| 8,520,906 B1 | 8/2013 | Moon et al. |
| 8,577,705 B1* | 11/2013 | Baboo ............... G06Q 30/02 705/7.11 |
| 8,812,344 B1* | 8/2014 | Saurabh ............ G06Q 30/0201 705/7.29 |
| 8,942,428 B2* | 1/2015 | Snook ............... A63F 13/213 382/107 |
| 8,972,902 B2* | 3/2015 | Nishihara ........... G06F 3/0425 715/863 |
| 9,120,621 B1* | 9/2015 | Curlander ........... G06K 9/00771 |
| 9,141,931 B2* | 9/2015 | Ackerman .......... G06Q 10/087 |
| 9,161,084 B1* | 10/2015 | Sharma ............ G06K 9/00778 |
| 9,262,681 B1 | 2/2016 | Mishra |
| 9,270,634 B1* | 2/2016 | Gu .................... G06Q 50/01 |
| 9,317,785 B1 | 4/2016 | Moon et al. |
| 9,383,895 B1* | 7/2016 | Vinayak ............ G06F 3/04883 |
| 9,412,099 B1* | 8/2016 | Tyree ................ G06Q 20/208 |
| 9,426,720 B2 | 8/2016 | Cohn et al. |
| 9,474,934 B1 | 10/2016 | Krueger et al. |
| 9,740,977 B1* | 8/2017 | Moon ............... G06K 9/00771 |
| 9,747,497 B1* | 8/2017 | Sharma ............. G06Q 30/0201 |
| 9,892,438 B1* | 2/2018 | Kundu .............. G06Q 30/0609 |
| 9,911,290 B1 | 3/2018 | Zalewski et al. |
| 9,916,010 B2* | 3/2018 | Harris ............... G06K 9/00671 |
| 9,948,902 B1* | 4/2018 | Trundle ............. H04N 7/183 |
| 10,007,948 B1* | 6/2018 | Nickerson .......... G06Q 20/208 |
| 10,055,853 B1* | 8/2018 | Fisher .............. G06K 9/20 |
| 10,083,358 B1* | 9/2018 | Shin ................ G06K 9/00295 |
| 10,127,438 B1* | 11/2018 | Fisher .............. G06N 3/04 |
| 10,133,933 B1* | 11/2018 | Fisher .............. H04N 5/247 |
| 10,134,004 B1 | 11/2018 | Liberato, Jr. et al. |
| 10,142,496 B1* | 11/2018 | Rao ................ G06F 3/014 |
| 10,198,080 B1 | 2/2019 | Worley, III et al. |
| 10,198,625 B1* | 2/2019 | Shin ................ G06K 9/00255 |
| 10,217,120 B1* | 2/2019 | Shin ................ G06Q 10/06393 |
| 10,225,524 B2* | 3/2019 | Oami .............. G06T 7/292 |
| 10,262,331 B1* | 4/2019 | Sharma ............. H04L 67/22 |
| 10,281,976 B2* | 5/2019 | Nishizawa .......... G06F 3/011 |
| 10,282,621 B2 | 5/2019 | Glaser et al. |
| 10,296,936 B1* | 5/2019 | Saurabh ............ G06Q 30/0246 |
| 10,339,595 B2 | 7/2019 | Glaser et al. |
| 10,347,009 B1 | 7/2019 | Terven et al. |
| 10,354,262 B1* | 7/2019 | Hershey ............ H04L 67/306 |
| 10,387,896 B1* | 8/2019 | Hershey ............ H04N 5/247 |
| 10,474,858 B2 | 11/2019 | Davis et al. |
| 2001/0010541 A1 | 8/2001 | Fernandez et al. |
| 2002/0122559 A1* | 9/2002 | Fay ................ G10H 1/0091 381/119 |
| 2003/0210340 A1 | 11/2003 | Romanowich |
| 2003/0216969 A1 | 11/2003 | Bauer et al. |
| 2004/0201754 A1 | 10/2004 | McAlister |
| 2004/0260513 A1 | 12/2004 | Fitzpatrick et al. |
| 2005/0096997 A1 | 5/2005 | Jain et al. |
| 2005/0189411 A1* | 9/2005 | Ostrowski .......... G07F 7/02 235/383 |
| 2005/0251287 A1* | 11/2005 | Thornton ........... G07F 9/026 700/233 |
| 2006/0032915 A1* | 2/2006 | Schwartz ........... G07F 7/00 235/383 |
| 2006/0147087 A1* | 7/2006 | Goncalves .......... G06K 9/3233 382/103 |
| 2007/0091177 A1 | 4/2007 | West et al. |
| 2007/0146873 A1 | 6/2007 | Ortyn et al. |
| 2007/0242300 A1 | 10/2007 | Inai |
| 2007/0284440 A1 | 12/2007 | Birmingham et al. |
| 2008/0226129 A1* | 9/2008 | Kundu .............. G08B 13/19673 382/103 |
| 2008/0228585 A1* | 9/2008 | Duri ................ G06Q 30/0224 705/14.25 |
| 2009/0150262 A1* | 6/2009 | Mizhen ............. G06Q 30/0601 705/26.1 |
| 2009/0195648 A1 | 8/2009 | Thomas et al. |
| 2010/0020173 A1 | 1/2010 | Marquart et al. |
| 2010/0031203 A1* | 2/2010 | Morris .............. G06F 3/04883 715/863 |
| 2010/0255902 A1 | 10/2010 | Goldstein et al. |
| 2010/0280956 A1 | 11/2010 | Chutorash et al. |
| 2010/0295946 A1 | 11/2010 | Reed et al. |
| 2010/0302138 A1* | 12/2010 | Poot ................ G06F 3/011 345/156 |
| 2011/0122231 A1* | 5/2011 | Fujieda ............. G06T 7/75 348/47 |
| 2011/0215147 A1* | 9/2011 | Goncalves ......... G07G 1/0063 235/383 |
| 2012/0019168 A1 | 1/2012 | Noda et al. |
| 2012/0027297 A1 | 2/2012 | Feris et al. |
| 2012/0173351 A1* | 7/2012 | Hanson ............. G06Q 20/12 705/17 |
| 2012/0242800 A1* | 9/2012 | Ionescu ............. G06F 3/017 348/46 |
| 2012/0265644 A1* | 10/2012 | Roa ................ H04L 67/34 705/26.61 |

(56) References Cited

U.S. PATENT DOCUMENTS

| | | | |
|---|---|---|---|
| 2013/0103537 A1* | 4/2013 | Hewett | G06Q 30/0633 |
| | | | 705/26.7 |
| 2013/0147963 A1 | 6/2013 | Henninger, I et al. | |
| 2013/0177201 A1 | 7/2013 | Fisher | |
| 2013/0215116 A1 | 8/2013 | Siddique et al. | |
| 2013/0218721 A1* | 8/2013 | Borhan | G06Q 20/322 |
| | | | 705/26.41 |
| 2013/0223673 A1 | 8/2013 | Davis et al. | |
| 2013/0284806 A1 | 10/2013 | Margalit | |
| 2013/0290557 A1 | 10/2013 | Baratz | |
| 2013/0317300 A1 | 11/2013 | Berci et al. | |
| 2013/0335571 A1 | 12/2013 | Libal | |
| 2013/0342688 A1 | 12/2013 | Siu | |
| 2014/0082519 A1 | 3/2014 | Wang et al. | |
| 2014/0082610 A1 | 3/2014 | Wang et al. | |
| 2014/0129688 A1 | 5/2014 | Asenjo et al. | |
| 2014/0245160 A1 | 8/2014 | Bauer et al. | |
| 2014/0263631 A1 | 9/2014 | Muniz | |
| 2014/0265880 A1 | 9/2014 | Taipale et al. | |
| 2014/0272855 A1 | 9/2014 | Maser et al. | |
| 2014/0279191 A1* | 9/2014 | Agarwal | G06Q 30/0633 |
| | | | 705/26.7 |
| 2014/0285660 A1 | 9/2014 | Jamtgaard et al. | |
| 2014/0297487 A1 | 10/2014 | Bashkin | |
| 2014/0330408 A1 | 11/2014 | Rolley | |
| 2014/0334684 A1* | 11/2014 | Strimling | G06K 9/3258 |
| | | | 382/105 |
| 2014/0363059 A1* | 12/2014 | Hurewitz | G06Q 30/0201 |
| | | | 382/118 |
| 2014/0365334 A1 | 12/2014 | Hurewitz | |
| 2014/0372957 A1 | 12/2014 | Keane et al. | |
| 2014/0380249 A1* | 12/2014 | Fleizach | G06F 3/017 |
| | | | 715/863 |
| 2015/0012396 A1* | 1/2015 | Puerini | G06Q 10/0875 |
| | | | 705/28 |
| 2015/0019391 A1* | 1/2015 | Kumar | G06Q 10/087 |
| | | | 705/28 |
| 2015/0029339 A1* | 1/2015 | Kobres | H04N 7/181 |
| | | | 348/150 |
| 2015/0039458 A1* | 2/2015 | Reid | G06K 9/00771 |
| | | | 705/26.1 |
| 2015/0046213 A1 | 2/2015 | Doreswamy et al. | |
| 2015/0061995 A1* | 3/2015 | Gustafsson | G06T 7/74 |
| | | | 345/156 |
| 2015/0077787 A1 | 3/2015 | Nishimura et al. | |
| 2015/0077797 A1 | 3/2015 | Kurokawa | |
| 2015/0088694 A1 | 3/2015 | Ackerman | |
| 2015/0095189 A1 | 4/2015 | Dharssi et al. | |
| 2015/0097961 A1 | 4/2015 | Ure et al. | |
| 2015/0124973 A1 | 5/2015 | Arteaga et al. | |
| 2015/0133190 A1 | 5/2015 | Fisher et al. | |
| 2015/0138383 A1 | 5/2015 | Kelley et al. | |
| 2015/0154973 A1 | 6/2015 | McKenna et al. | |
| 2015/0156332 A1 | 6/2015 | Kandregula | |
| 2015/0163412 A1 | 6/2015 | Holley et al. | |
| 2015/0227890 A1 | 8/2015 | Bednarek et al. | |
| 2015/0242859 A1* | 8/2015 | Viswanath | G06F 3/0482 |
| | | | 705/44 |
| 2015/0244992 A1* | 8/2015 | Buehler | G08B 13/19641 |
| | | | 348/159 |
| 2015/0310601 A1 | 10/2015 | Rodriguez et al. | |
| 2015/0327045 A1 | 11/2015 | Chang et al. | |
| 2015/0373509 A1 | 12/2015 | Wang et al. | |
| 2016/0012379 A1* | 1/2016 | Iwai | G06Q 10/063114 |
| | | | 705/7.15 |
| 2016/0019514 A1* | 1/2016 | Landers, Jr | G06Q 20/202 |
| | | | 705/20 |
| 2016/0027262 A1 | 1/2016 | Skotty et al. | |
| 2016/0037135 A1 | 2/2016 | McSheffrey et al. | |
| 2016/0100086 A1 | 4/2016 | Chien | |
| 2016/0110791 A1 | 4/2016 | Herring et al. | |
| 2016/0112608 A1 | 4/2016 | Elensi et al. | |
| 2016/0173827 A1 | 6/2016 | Dannan et al. | |
| 2016/0217388 A1 | 7/2016 | Okanohara et al. | |
| 2016/0224856 A1 | 8/2016 | Park et al. | |
| 2016/0242252 A1 | 8/2016 | Lim et al. | |
| 2016/0254864 A1 | 9/2016 | Mueller et al. | |
| 2016/0270191 A1 | 9/2016 | Ludwig, Jr. et al. | |
| 2016/0282039 A1 | 9/2016 | Motukuri et al. | |
| 2016/0289964 A1 | 10/2016 | Engberg | |
| 2016/0321506 A1 | 11/2016 | Fridental et al. | |
| 2016/0345414 A1 | 11/2016 | Nolan et al. | |
| 2016/0358312 A1 | 12/2016 | Kolb et al. | |
| 2016/0379213 A1* | 12/2016 | Isaacson | G06F 3/048 |
| | | | 705/44 |
| 2017/0032182 A1 | 2/2017 | Motukuri et al. | |
| 2017/0038846 A1* | 2/2017 | Minnen | G06F 3/1423 |
| 2017/0039613 A1 | 2/2017 | Kaehler et al. | |
| 2017/0053171 A1 | 2/2017 | Buehler | |
| 2017/0108236 A1 | 4/2017 | Guan et al. | |
| 2017/0123030 A1 | 5/2017 | Hengerer et al. | |
| 2017/0131781 A1* | 5/2017 | Buban | G06K 9/00335 |
| 2017/0161703 A1 | 6/2017 | Dodia | |
| 2017/0169440 A1* | 6/2017 | Dey | H04W 4/33 |
| 2017/0178352 A1 | 6/2017 | Harmsen et al. | |
| 2017/0188013 A1* | 6/2017 | Presler | G03B 17/56 |
| 2017/0216667 A1 | 8/2017 | Garvey et al. | |
| 2017/0278175 A1 | 9/2017 | Park et al. | |
| 2017/0316656 A1* | 11/2017 | Chaubard | G06Q 20/202 |
| 2017/0323376 A1 | 11/2017 | Glaser et al. | |
| 2017/0332956 A1 | 11/2017 | Bigolin et al. | |
| 2018/0005044 A1 | 1/2018 | Olson | |
| 2018/0012072 A1 | 1/2018 | Glaser et al. | |
| 2018/0012080 A1 | 1/2018 | Glaser et al. | |
| 2018/0088900 A1 | 3/2018 | Glaser et al. | |
| 2018/0107968 A1* | 4/2018 | Wu | G06Q 10/087 |
| 2018/0117446 A1* | 5/2018 | Tran | A42B 3/0433 |
| 2018/0182016 A1* | 6/2018 | Giampaolo | G06Q 30/0623 |
| 2018/0182024 A1* | 6/2018 | Nickerson | G06F 3/167 |
| 2018/0182026 A1* | 6/2018 | Nickerson | G06F 3/011 |
| 2018/0189763 A1 | 7/2018 | Olmstead et al. | |
| 2018/0232796 A1 | 8/2018 | Glaser et al. | |
| 2018/0240180 A1 | 8/2018 | Glaser et al. | |
| 2018/0245736 A1 | 8/2018 | Patel | |
| 2018/0276739 A1 | 9/2018 | Chopp | G06Q 30/0641 |
| 2018/0284900 A1* | 10/2018 | Ramachandra | G06F 3/0304 |
| 2018/0300553 A1 | 10/2018 | Khosla et al. | |
| 2018/0322209 A1 | 11/2018 | Jin et al. | |
| 2018/0332235 A1 | 11/2018 | Glaser | |
| 2018/0332236 A1 | 11/2018 | Glaser et al. | |
| 2018/0373928 A1 | 12/2018 | Glaser et al. | |
| 2019/0005479 A1* | 1/2019 | Glaser | G06Q 20/208 |
| 2019/0028643 A1 | 1/2019 | Oryoji | |
| 2019/0043003 A1* | 2/2019 | Fisher | H04N 5/232 |
| 2019/0054347 A1 | 2/2019 | Saigh et al. | |
| 2019/0079591 A1 | 3/2019 | Glaser et al. | |
| 2019/0114488 A1 | 4/2019 | Glazer et al. | |
| 2019/0116322 A1 | 4/2019 | Holzer et al. | |
| 2019/0122437 A1* | 4/2019 | Pinti | G06K 9/00671 |
| 2019/0156273 A1* | 5/2019 | Fisher | G06Q 10/087 |
| 2019/0156274 A1 | 5/2019 | Fisher et al. | |
| 2019/0156275 A1 | 5/2019 | Fisher et al. | |
| 2019/0156276 A1* | 5/2019 | Fisher | G06Q 10/087 |
| 2019/0156277 A1* | 5/2019 | Fisher | G06N 3/0454 |
| 2019/0156506 A1 | 5/2019 | Fisher et al. | |
| 2019/0205933 A1 | 7/2019 | Glaser et al. | |
| 2019/0230070 A1* | 7/2019 | Isaacson | H04W 12/084 |
| 2019/0333039 A1 | 10/2019 | Glaser et al. | |
| 2020/0004236 A1* | 1/2020 | Wang | G05D 1/0033 |
| 2020/0079412 A1 | 3/2020 | Ramanathan et al. | |
| 2020/0134590 A1 | 4/2020 | Glaser et al. | |
| 2020/0160670 A1 | 5/2020 | Zalewski et al. | |
| 2020/0265494 A1 | 8/2020 | Glaser et al. | |
| 2020/0279240 A1 | 9/2020 | Glaser et al. | |

* cited by examiner

US 11,226,688 B1

SYSTEM AND METHOD FOR HUMAN GESTURE PROCESSING FROM VIDEO INPUT

CROSS-REFERENCE TO RELATED APPLICATIONS

This Application is a Continuation Application of U.S. patent application Ser. No. 16/132,163, filed on 14 Sep. 2018, which claims the benefit of U.S. Provisional Application No. 62/558,731, filed on 14 Sep. 2017, both of which are incorporated in their entirety by this reference.

TECHNICAL FIELD

This invention relates generally to the field of human computer interaction, and more specifically to a new and useful system and method for vision-based associative interaction framework for human-computer interaction.

BACKGROUND

Computing devices, in particular personal computing devices, are an integral part of modern life. A recent trend in computing has been the emergence of ambient computing, which does not depend on physical interaction by a user with a device. Such devices are still limited in their adoption and are mostly limited to personal or home computing devices. There are numerous forms of user interfaces for when a user directly interacts with a known computing device. Ambient computing is currently still largely limited to a user directing voice or explicit gestures to a personal sensing device. The user typically is aware of the presence of this sensing device and eplicityly directs input towards it. In the field of voice-based user interfaces, a user speaks to a known listening device. In the field of computer-vision, user interfaces have been created that rely on deliberate gestures expressed by a user to a known camera. However, there are not pre-established intuitive user interfaces for interacting with ambient computing devices, and in particular an interaction framework does not exist for general video surveillance of an environment. For example, there is no existing solution for us in a commercial setting serving tens to hundreds of users simultaneously. Thus, there is a need in the human computer interaction field to create a new and useful system and method for vision-based associative interaction framework for human-computer interaction. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

Figure 1:
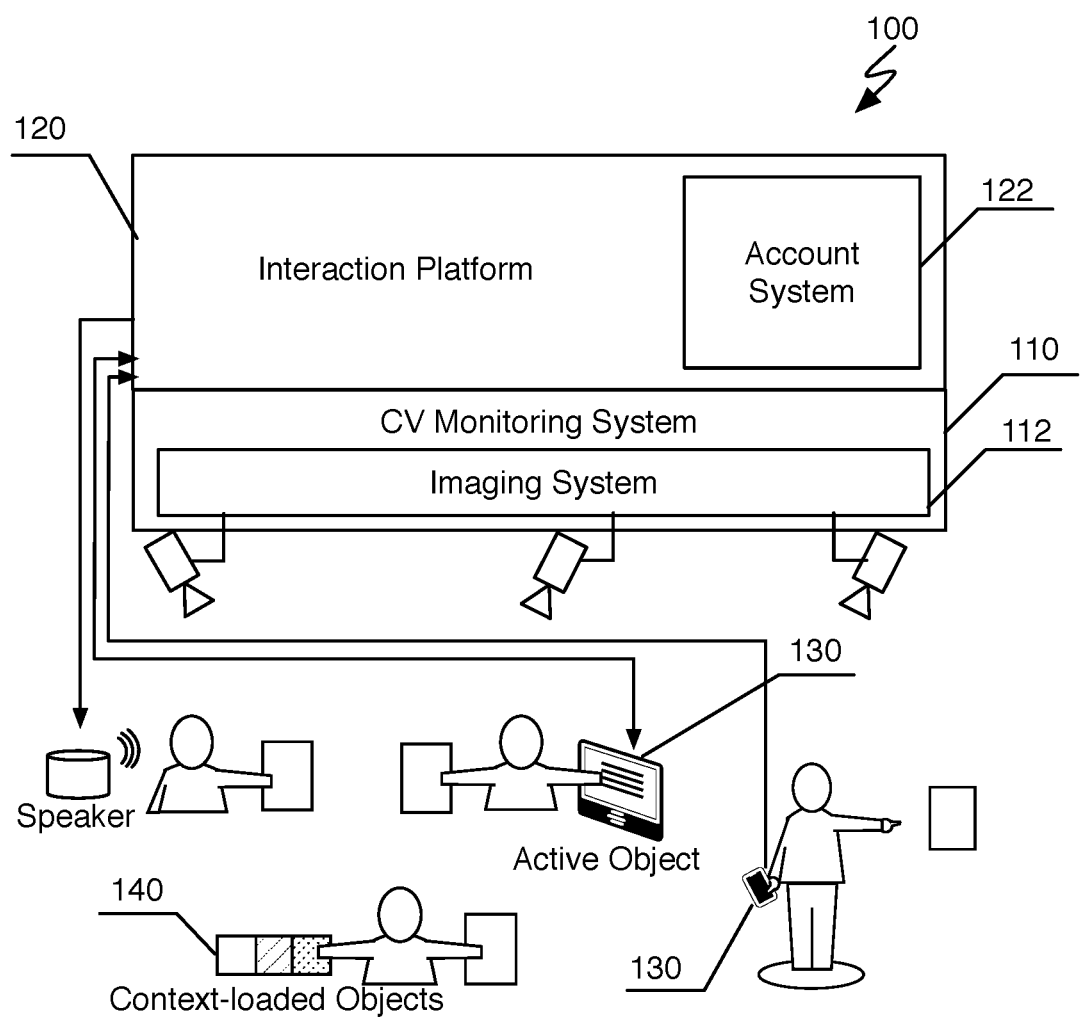
FIG. 1 is a schematic representation of a system of a preferred embodiment.

A system and method for a vision-based associative interaction framework for human-computer interaction of a preferred embodiment functions to enable CV-driven applications to leverage associative interactions with objects as a form of user input for a digital experience as shown in FIG. 1.

The associative interaction framework enabled through the system and method is based on the CV-driven detection of a user establishing an object interaction with one or more objects. Object interactions can be applied hand contact, a hand gesture applied to an object, digital interaction with an object that is a digital device, and/or other suitable forms of interaction. The properties of the object interaction, the type or identity of the objects, the identity or properties of the user, and/or other factors can then be variables in selecting and triggering an appropriate interaction event (i.e., an action).

As an illustrative example, the simultaneous contact with two objects using the two hands of a user can establish an associative interaction involving that user and the two objects. An action is then selected and triggered in response interaction properties like the type of objects, the identity and state of the user, and/or other conditions of the associative interaction. In the exemplary use case of a store, a customer (with or without an accompanying personal computing device like a phone) may be able to perform personalized user input simply be interacting with shelved products in different manners such as initiating an audio message played over a local speaker system near the customer.

The system and method preferably use CV-driven image analysis and the coordination of multiple devices in enabling a framework of receiving user input based around object associations and appropriately executing a response at one or more device integrated in the associated system. In an associative interaction framework, interactions can be derived from detectable interactions between two or more objects. Preferably, one of those objects is a user. Another preferred type of object is an object that is or previously was a static object present in the environment, which becomes the subject of an associative interaction based on the explicit actions of a user.

Natural object interactions of a user (like touching, grabbing, holding, pointing, standing in a location, and the like) can be used in controlling a rich set of user inputs simply by changing the number and type of objects interacted with by a user and the current context of the interaction. In a store setting, a user can be provided with a full set of user input functionality in any region monitored by a CV monitoring system and with an object for interaction.

In the case of a user-object interaction, a user can manipulate objects with one or both hands to establish an association with an object—that interaction with an object will trigger an interaction. Non-contact interactions may additionally or alternatively be supported. For example, pointing at an object, gesturing toward an object, directing attention to an object (e.g., directing gaze towards an object or directing front of body toward object), or other non-contact interactions may also be detected and considered as establishing an association with an object. The user could additionally or alternatively use other body parts such as their feet or body. Additionally, the user may be able to control interactions by touching and/or otherwise interacting with different objects in different combinations. The combination of object interactions forms different "user-object topologies" (i.e., interaction topologies) that are used in specifying the object associations.

One exemplary interaction can be a user touching or holding an item. This may be used in triggering the presentation of item-related information through a display or audio output. This may alternatively trigger transparent events like adding a touched product to a list of recently viewed items. Another exemplary interaction can be a user touching or holding two items. In a store environment, an associative interaction by a user with two products may be used to trigger a product comparison of the two held items.

As used herein, an associative interaction framework is the general descriptor of the form of gesture interface enabled by the system and method. Within the associative interaction framework, associative interactions are forms of "input". An associative interaction framework enables a rich set of computer interactions that can be based on detectable associative interactions. The interaction framework may include one or more types of associative interactions. The Interaction framework is generally described as being used by a user. The interaction framework can enable the detection of multiple interactions possibly performed by multiple users. Additionally, the associative interaction framework may have different sets of associative interactions for different contexts. For example, some sets of associative interactions may only be enabled for a subset of users (e.g., users enabling advanced type of interactions or users enabling select accessibility-related interactions).

As used herein, interaction topology is the general descriptor for the "network" established during a given associative interaction. A basic interaction topology is the connection of at least one object and a user, but more complex interaction topologies can include multiple objects and even multiple users or agents.

As used herein, an object interaction is used to characterize a CV-detectable event involving at least two objects that signifies an established association. A preferred form of object interaction is hand contact by a user with an object. Other forms of object interaction may also include detecting a user pointing at an object, detecting a user standing in an interaction region of an object (e.g., satisfying an object-proximity condition).

As used herein, an object association characterizes the result of a detectable object interaction that associates two or more objects. Multiple object interactions can establish multiple object associations. Normally, simultaneous object associations are evaluated in determining some interaction response/action. In some variations, object associations may be persistent for some period of time, wherein multiple object associations evaluated as a single associative interaction can be established through distinct non-concurrent object interactions. For example, comparing two products may be a command issued by a user touching a first object and then touching a second object within a specified time window (e.g., in under three seconds).

As used herein, object type is used to characterize the various properties of an object. The object type and the combination of object types involved in an object association will generally be used in selecting an appropriate interaction response/action. Some primary variations of object types can include passive objects, context-loaded objects, and active objects.

A passive object preferably characterizes an object that primarily services to modify the associative interaction by its visible identity. A passive object will generally not exhibit digital communication with the system (at least in the context of detecting associative interactions). Passive objects can be objects like a product.

Context-loaded object may be some object assigned significance. For example, a sticker placed on the shelf to indicate "favorite" action can enable a user to tap that sticker while holding an item to favorite it. A context-loaded object is usually used to set the type of action applied.

Active objects are generally computing devices integrated into the system that can be responsive to some action or can provide some supplementary form of input. An active object will generally be communicatively coupled with the system in some manner such that internal digital state can be communicated from the object to the system and/or data can be communicated to the active object. A tablet can be an active object where it will display different content based on what object is held by the user when the tablet is touched.

As used herein, a user is used as a descriptor for a CV-detectable person that is usually the agent responsible for establishing an interaction topology. Other types of agents may additionally be detectable alongside or in place of the user. The associative interaction framework is preferably operable across multiple users in an environment simultaneously.

The system and method are particularly applicable when implemented in an environment with an imaging system with distributed imaging devices. Since the environment will likely have multiple users observed at various instances, this variation may enable multiple users to deliver independent input through an environment-installed system to facilitate personalized interactions with a connected computing system. Additionally, the associative framework relies on more readily detectable "gestures" that can be detected through overhead video/image-based monitoring without the user explicitly "performing" the interaction for singular target. The associative interaction framework is preferably robust as a form of user interaction when the user is facing any direction and in any location in the monitored environment. Similarly, the system and method promotes overt actions readily detected and distinguished but interpreted to specify specific targeted interactions with a system.

As previously indicated, the system and method may be particularly applicable in use cases that involve object interactions. One exemplary use case can include building user experiences for consumers and workers in a commerce or retail setting where interactions with different products and objects in the environment trigger different events. In a commercial space, people browsing an aisle have their attention directed at where they are moving or towards the product of interest. In this environment, there is a plurality of objects substantially static and a user can selectively initiate an associative interaction with an object, which makes such an interaction framework particularly useful. The system and method may alternatively be used in any situation where an agent will be interacting with other objects or agents.

In particular, the system and method may be applicable as an interaction framework for CV-driven commerce. One such forms of CV-driven commerce is automatic or accelerated checkout. Automatic checkout may rely on detection and accounting of items selected by a user. The system and method can provide a complimentary interaction framework such that a user can perform a wider range of interactions beyond just adding or removing items from a virtual cart. The system and method may be used to perform actions such as generating an in-store browsing history, triggering a price check for an item, comparing prices of items, getting nutritional guidance, adding an item to a wishlist, enabling a user to select different information options by modifying an interaction with a gesture or by interacting with a context-loaded object, and/or performing any suitable action. The interaction framework may alternatively be used in any suitable environment such as the medical/hospital space, industrial/manufacturing space, food services, construction, office work, education, home and personal user, and/or any suitable application.

An environment as used herein characterizes the site where a CV monitoring system is installed and operational. The system and method can be made to work for a wide variety of environments. In a preferred implementation, the environment is a shopping environment such as a grocery store, convenience store, micro-commerce & unstaffed store, bulk-item store, pharmacy, bookstore, warehouse, mall, market, and/or any suitable environment that promotes commerce or exchange of goods or services. An environment is generally the inside of a building but may additionally or alternatively include outdoor space and/or multiple locations. In alternate use cases, the environment can include a household, an office setting, a school, an airport, a public/city space, and/or any suitable location. The environment can be a locally contained environment but may alternatively be a distributed system with wide coverage.

As one potential benefit, the system and method can enable an interaction framework for predominantly CV-driven applications. In environment-installed CV-driven applications there may be no known "sensor target" where a user can direct a gesture for user input. In other words, the users performing the interaction may not be directing interactions in the direction of a targeted sensing device. Accordingly, a CV-driven application operating over an imaging system installed in an environment may benefit from more intuitive interaction framework that leverages intuitive interactions and contextual interactions. In places of commerce, the system and method can provide a rich set of user interactions that are detectable and naturally performable by users.

As another potential benefit, the system and method can enable intuitive interactions. The system and method work to transform picking up items, pointing at items, and similar actions into system inputs. In one preferred implementation, the gesture interactions are natural enough that interaction events are triggered during normal user actions; but are also explicit enough that a user can discover and explicitly invoke such interaction events with some measure of control. Additionally, since the user is not directing the interactions towards a specific device for the intention of detecting the interaction, a user is relieved of actively.

Similarly, the interaction framework can be based around more natural interactions. However, variations of the system and method may appropriately gate such object interactions by explicit actions of the user so that unintentional triggering of an associative interaction is prevented or minimized.

Similarly, another potential benefit of the system and method is to customize interactions according to individual user preference. As a related potential benefit, the system and method may enable temporarily or permanently disabling interactions according to individual user preference. In one implementation, associative interactions may be incrementally introduced to a user during natural performance by a user, which functions to naturally introduce or expose functionality. In some variations, the user may select a preference to enable or disable the associative interactions in the future. For example, the first time a user picks up two products, product comparison feedback in response to this detected associative interaction can be introduced and optionally, the user can enable or disable this and other related features.

As another potential benefit, the system and method may enable contextual interactions. The interactions and the resulting interaction events can be customized to the involved objects, which can open up a wide range of types of control input. The framework can be highly extensible to enable a variety of ways that interactions may be modified or expressed. This framework can be customized and applied to different situations and use cases. Additionally, a user can exert active control over setting of context to direct the extraction of information and/or communicating some input.

As another potential benefit of some implementations, the system and method may enable passive and low infrastructure options for augmenting interactions. As the system and method operate over object interactions, all objects can become computer inputs to the CV-driven application. In a large environment, support infrastructure like computing kiosks can be cost prohibitive, and as such frequently not installed in many locations. The system and method can enable each object to be transformed to a mechanism that facilitates interaction input. In some implementations, context-loaded elements can be used within an environment to expose contextual interaction controls with minimal infrastructure investment. For example, printed labels can be positioned throughout the store and act as a context-loaded object to specify some associative interaction property.

As another potential benefit, the system and method can facilitate optimization of gesture-based associative interaction monitoring across a plurality of objects. For example, the system and method can support selective monitoring for associative interactions according to various trigger conditions. This can function to enable better computational efficiency and performance by not monitoring for interactions at all times for all users. For example, an associative interaction can depend on some level of proximity to an object. Accordingly, the system may trigger associative interaction monitoring only when a user is in a location that satisfies one or more object proximity conditions.

2. Associative Interaction Framework

The associative interaction framework operates based on the detection of an associative interaction through a CV monitoring system and then triggering an interaction event based on the properties of the associative interaction at one or more connected computing system. The associative interaction framework may have a number of dimensions for altering the interpretation of an interaction. Dimensions of the framework characterize possible factors that can be varied to alter the intent of an interaction. Two main dimensions of associative interactions include interaction topology and involved object types. Other optional dimensions can include user context, interaction modifiers, and interaction triggers. These different dimensions may be used to alter the interaction event and/or setting the interaction properties.

An interaction topology is the set of objects associated with some interaction and the configuration of how those objects are associated. An interaction topology preferably involves at least two objects that are associated with each other based on interaction. Associations are preferably established through contact, proximity, the holding an object, a particular interaction like pointing, or other detectable interactions between two or more objects. In one preferred type of associative interaction, the user acts as the associative bridge as an intermediary object establishing object associations with multiple objects. In other cases, non-human objects can act as the associative bridge. For example, a special mat, a basket, or shelf may be an associative bridge for objects placed in or on it. Placing items in a particular region may be used to convey some input to the system.

The interaction topology provides a flexible detectable construct on which various forms of interactions can be built. Different use cases may leverage different forms of interaction topologies. Two primary forms of interaction topologies can include single object associations and multi-object associations.

Figure 2A:
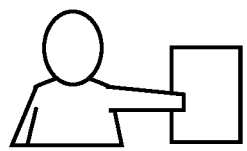
FIGS. 2A-2D are exemplary associative interactions with one or more objects.

As shown in FIG. 2A, a single object association can be established as an association between a user and one object. An object association can be established by various visually identifiable events. Preferably, visually identifiable events can include a user touching the object, a user grabbing or picking up an object, a user pointing at an object, a user and an object satisfying a proximity condition (e.g., having a displacement under a set threshold), a user adding an object to an existing user-associated object such as a cart or bag, and/or any suitable type of interaction. With a user, associations may be based on hand interactions, finger interactions, foot/leg interactions, head interactions, body interactions, and/or any suitable interaction. Different objects may have different interaction events that are used to establish an association. For example, a small product (e.g., a pillow) in a store may be added to the interaction topology in response to a detecting a user picking up and holding the item still for longer than half a second, but a large product in the store may be added to the interaction topology in response to detecting a user pointing at the product.

Figure 2B:
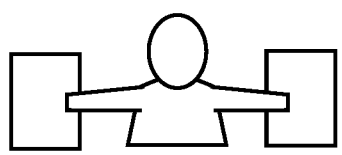
Figure 2C:
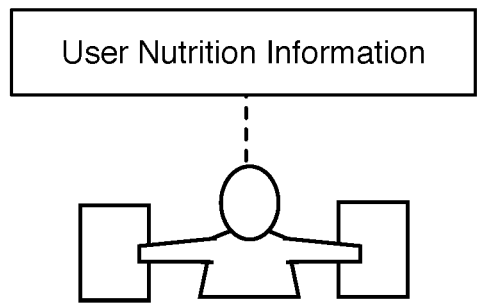
Figure 2D:
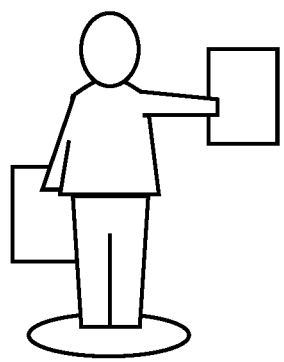

As shown in FIGS. 2B-2D, a multi-object association can be established as an association of a user with two or more objects. For example, a user interacting with two objects simultaneously (e.g., holding two objects—one object in each hand) can establish a multi-object association. Multi-object associations are preferably established through multiple single object associations. In one preferred variation, a multi-object association is established through a user holding or touching two objects. In another preferred variation, a multi-object association may be established by a user standing in a designated area (e.g., a marked location on ground) and holding or touching an object at the same time as shown in FIG. 2D. More than two single-object associations could also be established as also shown in FIG. 2D.

A multi-object association may be established with various sequencing rules or conditions. For example, one variation may have a temporal proximity condition where multiple object associations are recognized when made within a time window, otherwise only the initially established object association is considered. Alternatively, multi-object associations may be made dynamically whenever two or more object associations can be detected. For example, a user may grab a first object and then sequentially touch a second object, a third object, and then a fourth object, which could trigger detecting three multi-object associative interactions (e.g., a first and second object associative interaction, a first and third object associative interaction, a first and fourth object associative interaction).

In one optional operating mode, multi-object associations may be made in an accessibility mode that functions to enable multiple single object associations to be built up to specify a multi-object association. In one implementation, a multi-object association may be created by a user establishing multiple single object associations within a time window but without the single object associations necessarily overlapping in time. For example, a user with mobility challenges may enable an accessibility mode that is specifically applied to monitoring of associative interactions for that user. That user to compare two products may pick up one item and then within a long enough time period pick up a second item to trigger a multi-object associative interaction event.

As mentioned, a user or an alternative type of agent may be an element of the associative interaction. Herein, a user is used as the exemplary agent but an alternative agent such as an animal, robot, automobile, or other suitable type of agent could similarly act as the agent. There can be single agent and multi-agent variations of associative interactions. As an example of a multi-agent variation, a first and second user can make contact establishing an association between the two users. In this way a chain of object associations may be made. In another example, there may be use cases where any user in a set region should be considered linked, such that they can cooperatively trigger interactions.

The interaction object type of an object is another dimension of an associative interaction that functions to characterize the classification of the object. Different types of objects may trigger and/or alter different forms of interactions. The objects are preferably classified such that the classification and/or identity will determine the interaction. Object type can include general classification of an object, CV-derived object classification, a unique identifier for an object, linked properties of the object (e.g., product properties linked to the product identifier) and/or other forms of type classifications. Two general object types that can result in different forms of associative interactions include passive objects and active objects.

Passive objects are preferably objects with some detectable classification and/or identity and that have no integration with the CV-based system. The classification/identity of a passive object is the input from that object used in at least partially defining an associative interaction. For example, a product in a store can be a passive object—a user touching a can of soup will result in the product ID for that can of soup being used in triggering an associative interaction with the product ID as an interaction input.

Figure 3A:
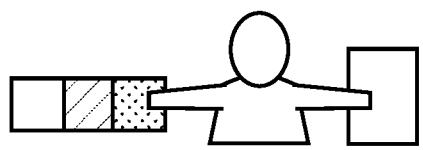
FIGS. 3A-3D are exemplary associative interactions involving a contextual object.

Passive objects could additionally be made to convey enhanced meaning. Context-loaded objects may serve to convey some special context to an interaction. A context-loaded object can be classified or identified as with other passive objects, but the object may be assigned set meaning within the interaction framework. For example, graphical stickers with different meaning could be placed on a shelf. A user can make contact with a product and different stickers to trigger different actions like request price information, request nutrition information, or save for later as shown in FIG. 3A. Context-loaded stickers such as this could affordably be distributed in a store, but enable rich and intuitive interactions by a user.

A context-loaded object may additionally have multiple dimensions of interaction and/or some mechanism for modifying the context. As an example of a context-loaded object with two dimensions of interaction, the object may have some exposed surface and depending on the point of interaction by a user (e.g., where a user touches in 2D space), different information is conveyed by interacting with that object. As an example of a modifier, a switch or dial that is part of a particular context-loaded object could be set to different positions and used to convey different information when involved in an associative interaction. The switch or dial could be passive in the sense that it is not digitally communicating its state to a connected system. The state of such a mechanical modifier is preferably visually detected by the CV monitoring system.

Active objects are preferably computer-based objects integrated into the system that can act as a digital input or output in addition to a CV-detectable object. An active input can preferably provide data to the system and method through a secondary channel (i.e., a non-visual channel). An active object can include a computing device such as a personal computing device, a digital kiosk, an autonomous device (e.g., robot, vehicle, etc.), or other suitable device. Examples of personal computing devices can include a personal phone, a smart watch, smart glasses, connected headphones, and/or any suitable type of personal computing device.

In many cases, the active object is capable of digital input and output, but some varieties of active objects may only be capable of either input or output.

Figure 4A:
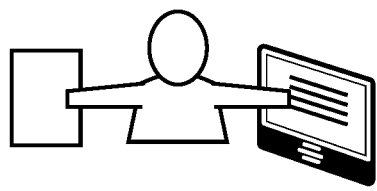
FIGS. 4A-4C are exemplary associative interactions involving an active object.

As an input, the state of an active object may modify an interaction in response to input delivered to the active object. An example of an active input object could be a keyboard where a user can enter information that is digitally communicated to the system and method. As another example, a touch display of an active object can be used to navigate a connected app's menu and select some interaction option (e.g., type of information to present) and then a user could touch a product as the shelf to serve as a second object in a multi-object associative interaction. The app running on the active object preferably communicates with the CV monitoring system and/or a connected system so as to relay the state information (e.g., the selected interaction option). The displayed option can modify the interpretation of the interaction as shown in FIG. 4A. A smart watch may serve as a particularly useful active object as a user could readily set the digital state of an application and then interact with an object.

As an output, the state of the active object can be changed as a result of an associative interaction. An example of an active output object could be a digital speaker or display that outputs information as a result of an associative interaction.

User context can provide another optional dimension to an associative interaction. A user acting as an agent in an associative interaction can have settings or configuration associated with his or her identity that may alter the interpretation or resulting action of an interaction. User context is preferably applied by identifying a user through biometric identification, account registration/identification, device synchronization, and/or other approaches. In one variation, a user may self-identify using a check-in kiosk upon entering the environment. In another variation, the CV-monitoring system can detect the identity of the user. The identity of a user may also be identified based on the user account logged into an application—this account-registered app can be matched to a user observed in the CV-monitoring system.

Upon identifying the user, the settings, configuration, session state, and/or other forms of account associated data can be accessed and used in altering the associative interaction. For example, a user may create a shopping list in an app. That shopping list may be used in altering the associative interaction when a user picks up an item from that list. Similarly, a user (or any type of agent) may have various forms of state information that can be used in altering interpretation or changing the resulting action of an interaction. For example, a user tracked within an environment may have CV-modeled state information (e.g., detected cart contents) that may be used independent of any account information in altering an associative interaction.

As another exemplary form of user context, a user may set preferences for how they want interaction events to be handled. A user may specify in an app or through an account management system their preference and configuration for actions responding to an associative interaction event. In one implementation, a user can specify their product-values, which may relate to their nutritional/dietary restrictions or preferences, moral guidelines (e.g., purchasing only local items), or other preferences. These may be used to appropriately present the right information for each user. In one variation, the user could configure user-devices to receive feedback on. For example, they could specify they want audio alerts to play through a connected headphone device or for notifications to be sent to a phone.

Figure 5:
FIG. 5 is an exemplary associative interaction with a gesture modifier.

An associative interaction may additionally be partially determined through some alternative modifier. State or gestures of a user may be used in modifying an interaction. One form of controllable state can be simultaneously detected gesture input. In one variation, during a single object association a user may apply a hand gesture modifier using the free hand as shown in FIG. 5. The hand gesture in combination with the other factors of the associative interaction can be used in specifying the result of the interaction. In one implementation, the number of fingers held out during an interaction may be used to issue a command. For example, a user can touch an object and then hold out one finger to save for later, two fingers to add to a delivery order, or three fingers to request nutritional information.

Similarly, various forms of controllable state of an object could similarly be used to modify an associative interaction. In one variation, the orientation of an object could be modified to signal different forms of input. For example, a user may tilt an object in different orientations and/or hold at different positions to signal different forms of input thereby triggering different interactions. In another variation, some objects different natural states like a book (e.g., opened and closed), which depending on the state or change of state of the object during the object interaction can modify the associative interaction.

Because the interactions are based on natural actions of a user, there may be particular user input triggers that are used to regulate when to execute or act on a current interaction. Interaction triggers may be another factor of an associative interaction and are preferably used to provide a control mechanism in signaling when an associative interaction can be executed.

An interaction trigger could be an interaction modifier. For example, a user may need to say some keyword while performing an interaction to execute some action. In another variation, a user may have to perform an explicit hand gesture with one hand while establishing an association with another object. The input provided may additionally modify the interaction as discussed above.

Another interaction trigger could be time. For example, an associative interaction may be triggered only when the associative topology and/or the state of the associative interaction is held for some period of time.

As another variation, an interaction trigger could depend on detecting holding an object in a predefined orientation range. For example, an associative interaction may be triggered when an associated object is held flat with the "face" up. For example, to request a price check, a user may have to hold a box of cereal substantially flat and face up.

Another optional dimension of associative interactions can be the sequencing of detecting an associative interaction. An associative interaction may additionally have different stages of interactions such as association-start, association-sustained, association-change (e.g., if one or more object is changed), and association-end. These may each trigger different events in the system. For example, the system could be configured to trigger various callbacks or event messages for each respective stage of an associative interaction. Similarly, the timing of these events can be used to convey some meaning. For example, events relying on modifiers may only be triggered on association-start or association-end.

The framework for associative interactions may be similarly extended to include other dimensions or factors in interpreting CV-detected input.

3. System for an Associative Interaction Framework

As shown in FIG. 1, a system 100 for an associative interaction framework can include a CV monitoring system 110 coupled to an interaction platform 120. Variations of the system may additionally include an account system 122, active interaction devices 130, and/or context-loaded elements 140. The system 100 functions to apply the associative interaction framework described above in executing interaction events within the interaction platform 120. The system 100 may be used in any suitable application. As described above, the system 100 can be particularly applicable to CV-driven applications within open environments where a plurality of agents may interact with an interaction platform 120 through a shared imaging system. Accordingly, the system 100 can independently and simultaneously detect associative interaction input of distinct agents in a monitored environment. In particular, the system may be applicable to enabling interactions for CV-driven commerce (e.g., automatic self checkout).

In one preferred variation of the system 100, in an interaction framework used for user input within an interaction platform used in an environment, the CV monitoring system 110 includes a plurality of imaging devices distributed at distinct locations across an environment. At least a subset of imaging devices is preferably mounted in an aerial location. The CV monitoring system no is additionally preferably configured to: collect image data, classify objects in the environment, and detect object associations. Classifying object in the environment preferably includes detection of a set of users that are present in the environment. Detection of object associations is preferably performed for at least one user and more preferably performed independently across a subset of users or all users. Associative interaction events may involve one or more object associations. In a two-object association, the CV monitoring system 110 preferably detects a first object association between the user and a first classified object, detects a second object association between the user and a second classified object, and initiates an associative interaction event with properties of the first classified object, the second classified object, and the user. The interaction platform 120 of the system 100 is preferably configured to initiate execution of a response to the associative interaction events with at least one computing device. This computing device may be an internal system of the interaction platform, a remote cloud hosted computing system, a site-installed computing device, a user device, or any suitable computing device.

A CV monitoring system 110 functions as a CV-driven imaging system to process and generate conclusions from one or more sources of image data. The CV system can provide: person detection; person identification; person tracking; object detection; object classification; object tracking; extraction of information from device interface sources; gesture, event, or interaction detection; and/or any suitable form of information collection using computer vision and optionally other processing techniques. The CV monitoring system 110 is preferably used to drive CV-based applications of the interaction platform 120. In the case of CV-driven commerce, the CV monitoring system 110 may facilitated generation of a checkout list (i.e., a virtual cart) during shopping, tracking inventory state, tracking user interactions with objects, controlling devices in coordination with CV-derived observations, and/or other interactions. The CV monitoring system 110 will preferably include various computing elements used in processing image data collected by an imaging system. In particular, the CV monitoring system 110 is configured for detection of agents (e.g., users) and established object associations as described above.

The CV monitoring system 110 can preferably track user activity for multiple users simultaneously, such that the system may support management of multiple virtual carts simultaneously.

The CV monitoring system 110 preferably operates in connection to an imaging system 112 installed in the environment. The imaging system 112 functions to collect image data within the environment. The imaging system 112 preferably includes a set of image capture devices. The imaging system 112 might collect some combination of visual, infrared, depth-based, lidar, radar, sonar, and/or other types of image data. The imaging system 112 is preferably positioned at a range of distinct vantage points. The imaging system 112 preferably forms substantially ubiquitous monitoring within the environment as described below. However, in one variation, the imaging system 112 may include only a single image capture device.

The image data is preferably video but can additionally or alternatively be a set of periodic static images. In one implementation, the imaging system 112 may collect image data from existing surveillance or video systems. The image capture devices may be permanently situated in fixed locations. Alternatively, some or all may be moved, panned, zoomed, or carried throughout the facility in order to acquire more varied perspective views.

In one variation, a subset of imaging devices can be mobile cameras (e.g., wearable cameras or cameras of personal computing devices). For example, in one implementation, the system 100 could operate partially or entirely using personal imaging devices worn by agents in the environment. The image data collected by the agents and potentially other imaging devices in the environment can be used for collecting various interaction data.

In a preferred implementation, at least a subset of the image capture devices are oriented for over-head monitoring, wherein the image capture devices collect a substantially aerial perspective. In a shopping environment, the imaging system 112 preferably includes a set of statically positioned image devices mounted with an aerial view from the ceiling. The aerial view imaging devices preferably provide image data across stored products monitored for virtual cart functionality. The image system is preferably installed such that the image data covers the area of interest within the environment (e.g., product shelves). In one variation, imaging devices may be specifically setup for monitoring particular items or item display areas from a particular perspective.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous though discontinuities of a region may be supported. Additionally, monitoring may monitor with a substantially uniform data resolution.

Large coverage, in one example, can be characterized as having greater than 95% of surface area of interest monitored. In a shopping environment, this can mean the shelves and product displays as well as the shopping floor are monitored. Substantial uniform data resolution preferably describes a sensing configuration where the variability of image resolution and/or coverage of different areas in the environment are within a target range. In the exemplary case of automatic checkout CV-driven applications, the target range for image resolution is sufficient to resolve product-packaging details for product identification.

Ubiquitous monitoring may optionally include the characteristic of redundant monitoring. This may involve having redundant coverage from multiple vantage points. For example, an item on a shelf may be visible by two different cameras with adequate product identification resolution and where the cameras view the item from different perspectives. In an environment like a grocery store this could mean 10-200 cameras distributed per an aisle in some exemplary implementations.

Similarly, the system 100 may additionally include other computer input or output devices across an environment. The system 100 and method can be used in the collection of sensor data and/or generation of an output in addition to or as an alternative to video and/or image data. Other forms of devices such as microphones, Bluetooth beacons, speakers, projectors, and other suitable devices could additionally or alternatively be integrated into system modules that may be installed across an environment. Herein, the system and method are primarily described as it relates to image-based video monitoring.

The CV monitoring system 110 is preferably used in the detection of associative interactions, but the CV monitoring system 110 will generally be simultaneously be used in executing other CV-based functionality. For example, in a store environment (e.g., a grocery store), the CV monitoring system 110 can be configured to additionally track a checkout list for automatic checkout and/or expedited checkout at a checkout station. In one variation, the CV monitoring system no may be used to generate a virtual cart, which may be performed in a manner substantially similar to the system and method described in US Patent Application publication No. 2017/0323376, filed 9 May 2017, which is hereby incorporated in its entirety by this reference. In other settings like an industrial, office, or hospital setting, the CV monitoring system 110 may be used to monitor worker actions and operations. In environments like a gym or other areas it may track activity. Herein, the use case of tracking item selection for facilitating checkout is used as a primary example, but the system 100 is not limited to such uses. The CV monitoring system no may be used for any suitable additional functionality alongside associative interaction monitoring.

The CV monitoring system no can include a CV-based processing engine and data management infrastructure. The CV-based processing engine and data management infrastructure preferably manages the collected image data and facilitates processing of the image data to establish various modeling and conclusions relating to interactions of interest. For example, the selection of an item and the returning of an item are or particular interest. The data processing engine preferably includes a number of general processor units (CPUs), graphical processing units (GPUs), microprocessors, custom processors, and/or other computing components. The computing components of the processing engine can reside local to the imaging system 112 and the environment. The computing resources of the data processing engine may alternatively operate remotely in part or whole.

The CV monitoring system may additionally or alternatively include human-in-the-loop (HL) monitoring which functions to use human interpretation and processing of at least a portion of collected sensor data. Preferably, HL monitoring uses one or more workers to facilitate review and processing of collected image data. The image data could be partially processed and selectively presented to human processors for efficient processing and tracking/generation of a virtual cart for users in the environment.

The system 100 may additionally include additional sensing systems such as a user location tracking system. Location tracking can use Bluetooth beaconing, acoustic positioning, RF or ultrasound based positioning, GPS, and/or other suitable techniques for determining location within an environment. Location can additionally or alternatively be sensed or tracked through the CV monitoring system 110. The CV monitoring system 110 can include a user-tracking engine that is configured to track user location. Preferably, the user location can be used to generate contextual data of user location relative to the environment. This may be used to detect items in proximity to a user. Nearby items can be set as a set of candidate items, which may be used to bias or prioritize identification of an item during management of the virtual cart.

In one implementation the image capture devices can be distributed as camera modules. The camera modules may be multifunctional and can include other supplementary components used in offering additional or enhanced sensing or functionality. Supplementary components may include microphones, speakers, area lighting, projectors, communication modules, positioning system modules, and/or other suitable components. Alternatively, the supplemental sensors and computing components may be integrated into the system 100 separately or in any suitable manner. In one variation, the camera module and/or the system 100 can include microphones such that a distributed audio sensing array can be created. Audio sensing can be used in identifying, locating, and collecting audio input from different locations. For example, the system with microphones can triangulate sounds to determine location within the environment. This can be used to facilitate CV-based tracking. This could alternatively be used in enabling audio-based interactions with the system 100. In one variation, the microphone array provided through the monitoring network may be used to facilitate multi-user audio-interfaces within an environment (e.g., an in-store customer audio-interface. For example, a user could issue audio commands from any place in the store, this could be synchronized with the CV-driven application which may be used to associate a detected audio command with a user entity or account issuing that command. In one implementation, the microphone array may be used in differentially locating, processing, modifying, and responding to audio sources as discussed in published U.S. patent application Ser. No. 17/717,753, filed 27 Sep. 2017, which is hereby incorporated in its entirety by this reference.

In another variation, the camera module and/or the system 100 can include integrated speakers, which can function to enable audio output. In one implementation, this may be used to simply play audio across an environment. The speakers are preferably individually controllable, and targeted audio could be played at different regions. This can be used in delivering audio feedback to a user based on the associative interactions of that particular user where the feedback is played on an environment-installed speaker that's near the user.

An interaction platform 120 functions to be a computing environment that can be responsive to detected associative interactions. The interaction platform 120 preferably manages the interactions as well as possibly orchestrating other functionality. An interaction platform 120 is preferably a remote computing environment where account-based interactions can be executed. The interaction platform 120 could additionally or alternatively computing resource(s) that are locally hosted at or near the environment. The interaction platform 120 may include an account system 122. The interaction platform 120 may alternatively be one or more computing devices.

In one use-case, the interaction platform 120 is configured to facilitate automatic self-checkout, facilitated checkout (using a CV-based detected checkout list) and/or in-store commerce interactions. The associative interactions may be used within the interaction platform 120 to facilitate interactions such as creating a physical in-store browsing history, performing price check, comparing prices between two objects, requesting nutritional guidance, adding an item to a wishlist, triggering an in-store promotion, augmenting in-store device interactions, and/or other suitable forms of interaction.

An account system 122 can include account-level configuration and data associations. An account system 122 may be used to store user state information, user preferences, user lists or digital collections, user platform history (e.g., purchase history and the like), and/or any suitable information. The account system may additionally include a record of user devices that may be usable as inputs or outputs for the associative interaction events.

An active interaction device 130 functions to bridge digital interactions with objects included in the interaction topology. An active interaction device 130 is preferably a computing device that can act as an active object as described above. Multiple types of active interaction devices 130 may be used within an environment. An active interaction device 130 can either provide an additional source of input in augmenting the associative interaction and/or act as an output controlled in response the associative interaction. An active interaction device 130 may be an environment-installed device. For example, an informational computer kiosk or a checkout kiosk may be distributed within a store environment. In this variation, multiple users may be expected to interact with the device. Accordingly, user-to-device object associations may be established as a user uses the device. Biometric or other form of user identification may be used in determining who is interacting with the device. Alternatively, the CV monitoring system 110 could facilitate detecting who is using the device.

Active interaction devices 130 may alternatively be user-controlled devices such as a user phone, a smart watch, smart glasses (e.g., augmented glasses), connected headphones, other wearable computing device, and/or any suitable computing device. Commonly, the user-controlled device will include an installed application that can run in the foreground and/or background to facilitate managing state, receiving user input, collecting sensor data, and/or controlling user interface output (e.g., visual, audio, tactile feedback). A personal active interaction device 130 may be explicitly observed during the associative interaction. For example, a user may be holding their phone with an app active. Alternatively, the personal active interaction device 130 may be detected or previously detected but hidden or obscured during an associative interaction. For example, a user may set some option impacting interaction events on their phone, but then have their phone in their pocket when establishing an associative interaction with a product. The app/phone's state may still be considered as an associative interaction property and used to modify the interaction event.

Personal computing devices may additionally be used as an output (independent of defining an instance of an associative interaction). For example, the display or audio output of a personal computing device may be updated and controlled in response to associative interactions involving device owner. In some instances, phones, smart watches, smart glasses (e.g., glasses or other head worn devices that may have camera/imaging system, AR/VR display, microphone, speakers, etc.), connected head phones, or other personal devices may communicatively connect to the interaction platform 120 while the user is in the environment so that various forms of output could be delivered to that device in response to associative interaction events. For example, in response to an associative interaction mapped to some form of information delivery, the interaction platform 120 may be configured to send an instruction to a computing device of the involved user to play audio that relays that information. Similarly, a display may be instructed to present the information.

The system 100 may additionally include context-loaded elements 140 that function to act as context-loaded objects within the associative interaction framework. Context-loaded elements 140 can be any suitable type of object. One preferred implementation may use graphical markers as context-loaded elements 140. Graphical markers can be stickers, signage, marketing materials (e.g., product packaging), or other forms of graphical markers. As one exemplary use of context-loaded elements 140, the system 100 may include stickers with distinct graphical regions that can be touched during an associative interaction to trigger different interactions. In another example, a marker on the ground may be used as a context-loaded object, where a particular type of associative interaction is triggered when a user steps on the marker.

A context-loaded element 140 is preferably an object that is configured to be visually detectable and identifiable (e.g., identifying type or a unique identifier). The context-loaded element 140 may additionally include two or more sub-regions that are distinct so as to signal distinct modifications to an associative interaction. As another variation, the context-loaded element 140 may have an interaction region where interactions can be interpreted along a graduated scale. A context-loaded element could include a region along a path where touch contact can signal some scale metric (e.g., a value varying from 0 to 10). This may be used, for example, to set the volume of an audio system that acts as active interaction device 130 when the user establishes object associations with the context-loaded element (e.g., touching the scale) and the audio system (e.g., pointing at the audio system device).

The system 100 and its components preferably includes machine-readable configuration to execute or perform the operations described herein.

4. Method for an Associative Interaction Framework

Figure 6:
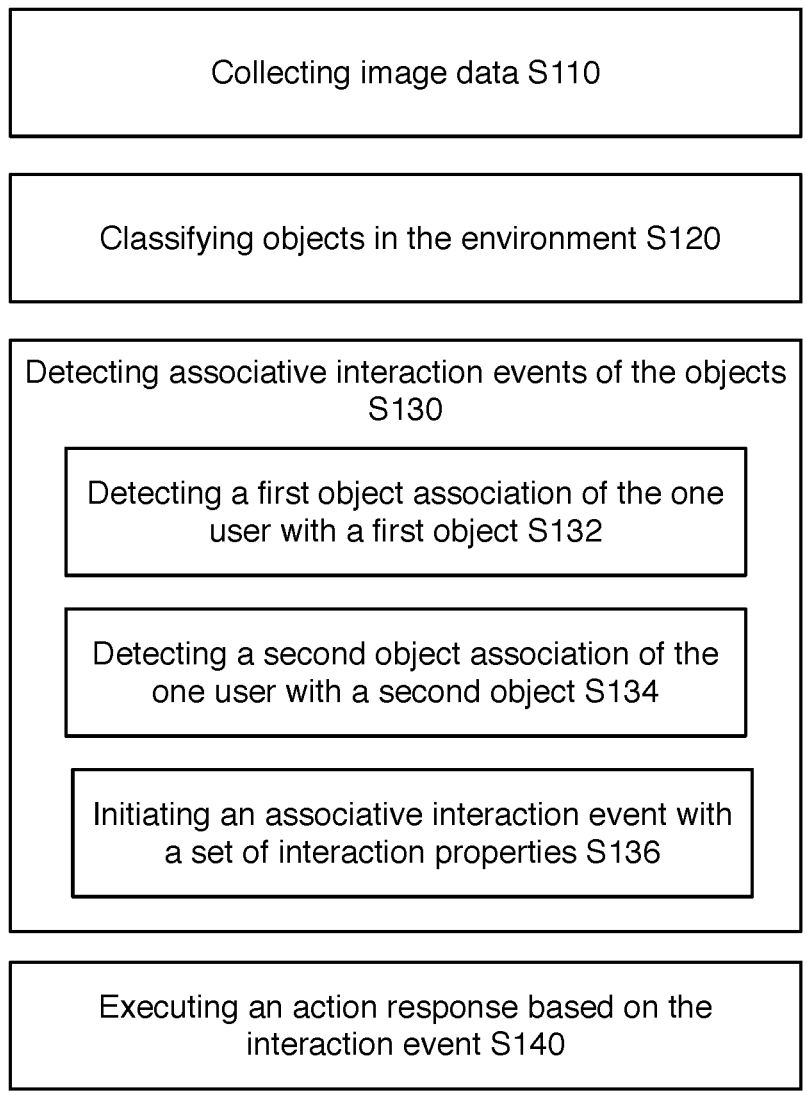
FIG. 6 is a flowchart representation of a method of a preferred embodiment.

As shown in FIG. 6, a method for an associative interaction framework of a preferred embodiment may include collecting image data S110; classifying objects in the environment S120; detecting associative interaction events of the objects S130; executing an action response based on the associative interaction event S140. The method functions to facilitate detection and execution of an associative interaction framework.

As primarily described herein, the method is described as being used across a plurality of users in an environment. For example, the method could be used for an interaction framework to collect user input in a store environment. Using an environment CV monitoring system, which is used in monitoring multiple users, the method is preferably being executed in parallel across multiple users within an interaction platform. Furthermore, some variations of the method can operate across users in an environment independent of the user having previously been enrolled or possessing configured device.

The method may alternatively be used for more confined environments and optionally be limited to monitoring one or a limited set of users. The method herein is primarily described as it can be used in commerce-based environments, but as described above it can be applied in any suitable environment. The method is preferably implemented by a system as described above, which is configured for facilitating an associative interaction framework. Similarly, the method is preferably used to implement and facilitate the associative interaction framework and its various potential implementations as described herein.

Block S110, which includes collecting image data, functions to read or access video and/or image data from the environment. This may include collecting image data from plurality of imaging devices that are distributed across an environment. In one preferred implementation, the collection of image data is achieved through a CV monitoring system configured for ubiquitous monitoring as described above. Each imaging device preferably collects a stream of image data, which may be analyzed individually or in coordination with one or more additional streams of image data. In some environments such as stores and/or commercial spaces, a subset of the image data may be collected from aerial perspective. The imaging devices preferably include suspended mounting fixtures such that they can be secured to the ceiling, shelving, pillars, or other structures such that the imaging devices capture users from above. In many instances, the imaging devices are configured to be positioned at least eight feet above the floor. Collecting image data may alternatively include collecting image data from a single camera. In one alternative implementation, smart glasses with a camera may implement a version of the method for detecting associative interactions using a single imaging device of the smart glasses.

One potential benefit of the associative interaction framework is that it can be operable through "gestures" or interactions that do not need to be directed towards an imaging device. Multiple imaging devices may be used in combination in providing image data used in detecting a single associative interaction. Multiple independent associative interactions can preferably be detected within the image data in different locations and at different times. Accordingly, classifying of objects S120 and detection of object associations in block S130 may be achieved through two or more streams of image data. For example, block S130 may include detecting a first object association through a first stream of image data collected from a first camera and detecting a second object association through a second stream of image data collected from a second camera.

Block S120, which includes classifying objects in the environment, functions to detect a label or identifier for objects in the image data. Classifying objects can include classifying passive objects, context-loaded objects, active objects, and/or other suitable types of objects. Additionally, classifying objects may additionally include detecting and/or tracking users or agents. Detection and/or tracking of users may be implemented through the same or different process of classifying other types of objects. In an implementation used for commerce-based use cases, individual product items and users can be two types of classified objects. Product items can be classified using computer vision based machine learning and algorithmic approaches to recognizing an item by its packaging, shape, and/or other properties. Classifying a product can generally map the product back to a product identifier (e.g., a SKU identifier), which may have a variety of properties associated with it.

In the case of a food-related product, properties of the product can include information such as a product name, a quantity metric, price, price per unit, nutritional information, ingredient list, certifications (e.g., Organic, non-GMO, gluten-free, sustainably sourced, etc.) and/or other attributes. Some or all properties may be accessed in determining interaction events or used as part of a resulting action. For example, an interaction event may result in information relating to one or more property being communicated to the associated user.

Various CV-based object classification techniques may be employed in object detection and classification such as a "bag of features" approach, convolutional neural networks (CNN), statistical machine learning, or other suitable approaches. Neural networks or CNNs such as Fast regional-CNN (r-CNN), Faster R-CNN, Mask R-CNN, and/or other neural network variations and implementations can be executed as computer vision driven object classification processes. Image feature extraction and classification is an additional or alternative approach, which may use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques. Object classification and detection models can be trained on particular types of device interface sources.

As part of or in addition to classifying objects, the method can include detecting users that are present in the environment. In some variations, the method may more specifically include tracking a plurality of users. In one variation, the method may simply detect users without performing persistent tracking of the user through the environment. Tracking preferably identifies a user and then monitors their path through the environment. Detecting and/or tracking of users are preferably performed through computer vision analysis of the image data.

Users can be uniquely identified. In this variation, the user objects may be associated with an account or user identity record. User objects can be associated with an account or user identity through biometric identification, user-initiated identification, device identification, or other suitable forms of user identification.

Alternatively, users may not be uniquely identified and simply detected as a user. For example, without performing unique identification, the method could enable a customer in a store to be detected interacting with a product and then a store-installed speaker or screen could display information relevant to that product.

Detection and/or tracking of a user may additionally use other forms of sensing such as Bluetooth beaconing, synchronizing with personal computing devices, position tracking systems, and/or other suitable systems.

User objects may additionally be biomechanically modeled such that the body parts of the user can be monitored for object interactions. Accordingly, the body, arms, hands, legs, feet, head, and/or other body parts may be modeled.

Figure 7:
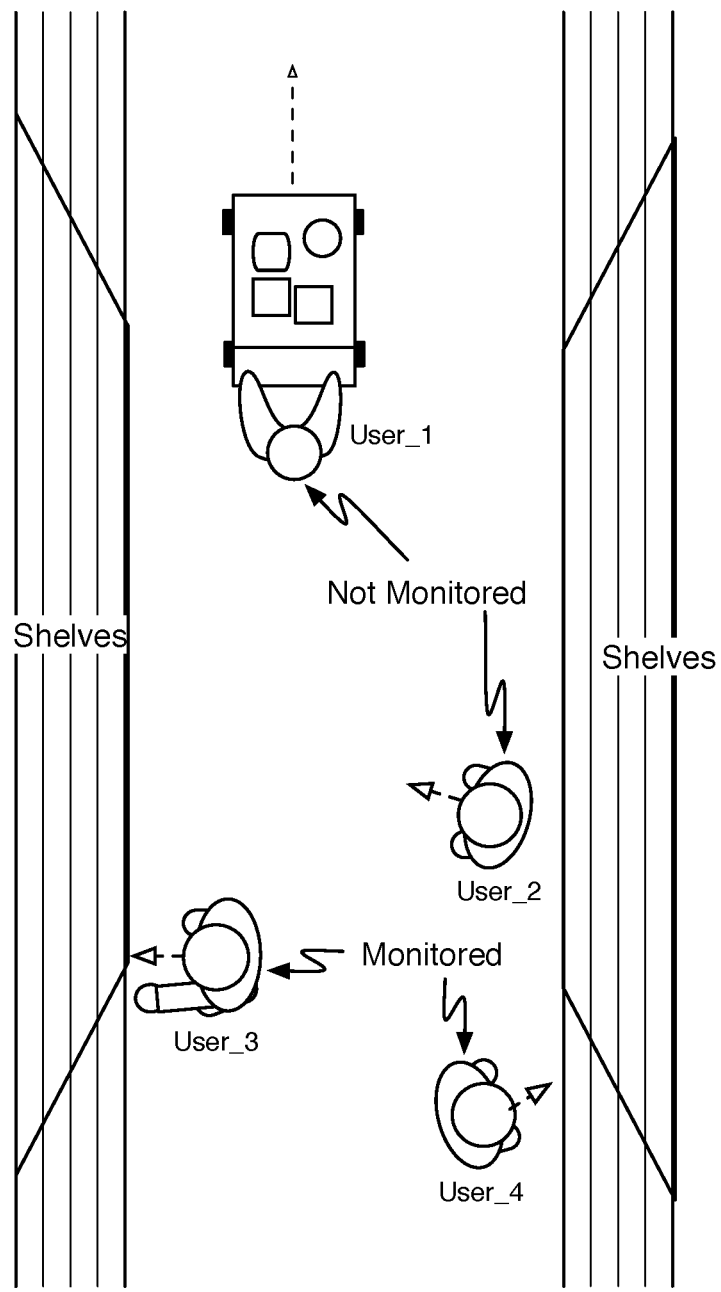
FIG. 7 is a schematic representation of an exemplary implementation used to trigger a product comparison.

Detecting and/or tracking a user can be used to enable or disable monitoring for an associative interaction. Detecting a user as a non-interactive user can disable evaluation for associative interactions. In one variation, the tracking of a user as it relates to location, orientation, and movement may be used to temporarily or permanently disable associative interaction detection for that particular user as shown in FIG. 7. Associative interaction detection can be disabled for users positioned in regions out of range for performing associative interactions. For example, a user in the middle of an aisle may be too far to be associated with an object. Additionally or alternatively, associative interaction detection can be disabled for users moving in a way that satisfies particular properties (e.g., walking with a fast pace), oriented relative to nearby objects in a particular manner (e.g., facing away from products), or satisfying other conditions.

In another variation, the detection of a user as it relates to identity can be used to temporarily or permanently disable associative interaction detection for that particular user. For example, workers in a store may be identified. A user could be classified as a worker based on appearance (e.g., wearing a uniform or worker badge). A user could alternatively be classified as a worker using unique identification of the user and then detecting that user identity is a worker. Other alternative approaches may similarly be used.

Block S130, which includes detecting associative interaction events of the objects, functions to functions to determine when objects are part of an associative interaction. An associative interaction event preferably involves detecting interaction conditions of two or more objects. Interaction conditions preferably characterize the condition in which object associations are established. In a basic two-object interaction, this will generally involve establishing at least one association between an agent (e.g., a user) and at least a second object. Multiple object associations may satisfy an interaction condition such that the interaction topology is a multi-object association.

A site-installed CV monitoring system will preferably detect the associative interaction event. An alternative system component may alternatively be configured to interface with the CV monitoring system to analyze image data and detect associative interaction events.

The triggering of an action is preferably responsive to the various properties of the associative interaction event such as the interaction topology, object type, modifiers, user/agent associated data, input from active objects, and/or other factors and interaction properties. The associative interactions preferably map to appropriate actions and events.

An interaction condition is preferably a CV-derived condition, which involves detecting an object association condition and establishing the object association between the involved objects. This may occur multiple times with different objects forming an interaction topology of different objects. One preferred implementation of an interaction condition is object proximity or contact. For example, the interaction condition can define a minimum proximity threshold for a user's hands and objects. When one of the user's hands comes within a certain distance of an object, then an object association may be established. Some variations may include applying CV-based approaches to detecting some object interaction such as detecting hand grasping of an object, detecting hand pointing to an object, detecting direct visual attention, detecting user standing on an object, or other suitable directed gestures.

Detecting associative interaction events within an associative interaction framework may detect a variety of types of interactions that vary along different dimensions. The combination of objects, the state of active objects, the type of context-loaded object, user-associated data, additional detected user input, and/or other factors may be used in different ways to determine a resulting action. As discussed herein, various forms of interactions may be detected depending on if the user establishes associations with one or more objects, with a passive object (e.g., a product), with one or more active objects, with context-loaded objects, and/or alongside other user inputs.

For an associative interaction of a user with a single object, block S130 can include, through computer vision analysis of the image data, detecting a first object association of the one user with a first object S132, and initiating an associative interaction event with a set of interaction properties including properties of the user and the first object association.

In some variations, the initiation of an associative interaction event is preferably in response to satisfying an interaction condition. For example, some interaction frameworks may involve particular conditions that restrict when an associative interaction event is considered. The interaction condition can be related to duration (e.g., needing to detect sustained object association some minimum amount of time), an accompanying detected event (e.g., detecting a second user input like a voice command or CV-detected hand gesture), and/or other factors.

For an associative interaction of a user with a two or more objects, block S130 can include, through computer vision analysis of the image data, detecting a first object association of the one user and a first object S132; through computer vision analysis of the image data, detecting a second object association of the one user with a second object S134; and initiating an associative interaction event with a set of interaction properties including properties of the user, the first object association, and the second object association S136. Any suitable number of objects may have detected object associations. In general, object associations are established through hand contact. Multiple objects may have object association established from a single hand. Additionally, the legs of the user or other body parts or techniques could similarly be used to establish an association. As mentioned herein, associations can be transitive so a chain of objects can all be part of an interaction topology. In one example, a user may place multiple items in a basket or cart and then with another hand perform some hand gesture satisfying the interaction condition thereby triggering the associative interaction event. All the products in the basket could be incorporated into the resulting action. As an example, this could be performed by a user to request the total price of the products, total nutritional information (e.g., total caloric count), bulk check all items for certain properties.

In detecting an object association, the type of associative object, the identity or classification of the object, and other object related properties may be determined. The associative object can be a passive object, a context-loaded object (i.e., a contextual object), an active object, and/or any suitable type of associative object. The identity or classification relates to an identifier or label for the object such as its SKU identifier, device identifier, type of context-loaded object.

A passive object will generally be static in the environment. Its identity is preferably directly related to its properties. In a commerce-based use-case, the first, second, and/or any object can be a product (e.g., goods for sale within the environment). For example, products like various cereal varieties, cans of soup, drink bottles, bags of snacks, and/or other grocery items are generally passive objects. In the example, where two object associations are associated with two products, then the resulting interaction event may initiate an action that compares the products. Accordingly, executing the action of block S140 can include generating a comparison of at least one product attribute of the first object and the second object and communication presenting the comparison through an output device in proximity to the user a shown in FIG. 8.

Context loaded objects as described above have pre-defined meaning in relationship to an interaction event. For example, their identity or the way a user engages with the context-loaded object can alter the interpretation of the interaction event. In one example, the method may include detecting a price-check context-loaded object, detecting a nutritional information context-loaded object, detecting an action-trigger context-loaded object (e.g., to initiate a specified action like add to a wishlist), and/or any other suitable type of context-loaded object.

A single context-loaded object may additionally have various subregions or visually detectable features or mechanisms where the detected nature of interaction with the context-loaded object can modify the associative interaction event. For such a variety of object, block S130 may include visually detecting state of interaction with the context-loaded object and adding the detected state to the interaction properties, thereby modifying the nature of the interaction event. In one example, this may include visually estimating touch location on the context-loaded object, mapping that location to pre-configured property, and setting the pre-configured property in the interaction properties used to determine the resulting action.

Figure 9:
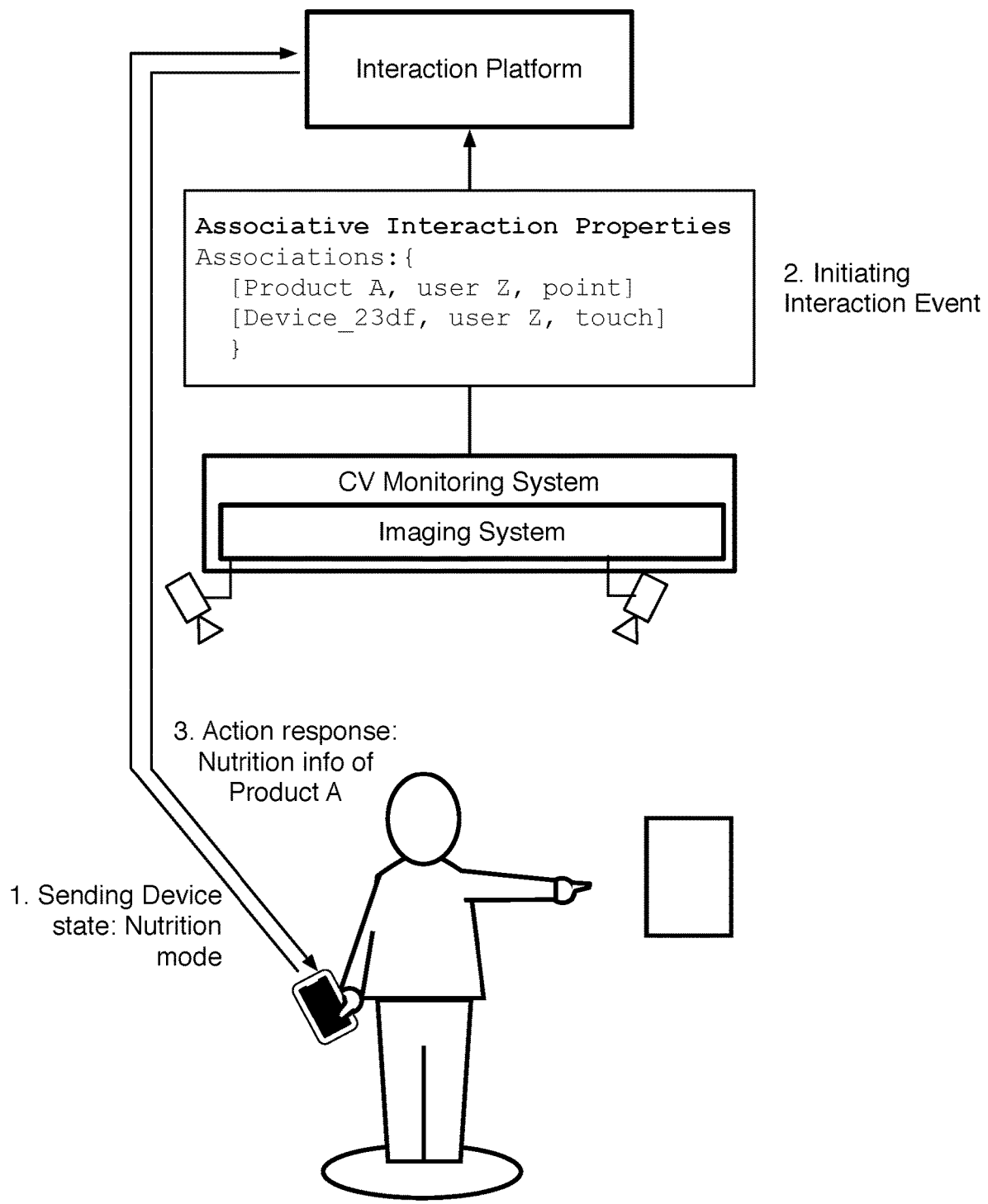
FIG. 9 is a schematic representation of an exemplary implementation of receiving data from an active device as part of defining the associative interaction event.

In detecting an active object, the system may identify a communication endpoint associated with the active device and initiate communication with the active device. This may be performed to request state information or other forms of data from the active device. Alternatively, the active device may have been proactively relaying information to the interaction platform coordinating the interactions. In this case, the state information and/or other appropriate data may already be accessible such that the appropriate data can be accessed based on the identity of the device. Accordingly, the method may include receiving data from an active object, wherein the interaction properties includes the received data as shown in FIG. 9.

In one example with an associative interaction event with two object associations, the first object can be an active object. As an active object, the active object is preferably in communication with the interaction platform or other suitable system component managing interactions. In one variation, the active object is a personal computing device wherein the user may enter some information or set some configuration. In another variation, the active object may be a computing device installed or belonging to the environment. The data of the personal computing device is relayed to the interaction platform and associated with the associative interaction event, whereby the interaction properties are set in part based on data from the active object. The resulting action may be altered based on the received data. In a similar example, a second object or more objects can be an active object in communication with the interaction platform.

Active objects involved in an associated interaction event may additionally or alternatively be involved in an action resulting from the associative interaction event. This may be in addition to communicating data to an active object (e.g., a connected device). For example, an associative interaction event involving a screen and a product may result in user-relevant product information being displayed on the display.

In one variation, detecting an associative interaction event can additionally include detecting a user input, wherein the associative interaction properties includes properties of the user input. The user input is preferably used to modify the interaction event. In one implementation, the user input is added an interaction property. The user input could alternatively be used in the detection or triggering or an interaction event. For example, an explicit user input may be required to trigger an associated interaction event.

User input can be detected in a variety of ways. In one variation, detecting the user input can include, through computer vision analysis of the image data, detecting a gesture mapped to a modifier property. The gesture could be a hand gesture, a head or facial gesture, a foot/leg gesture, and/or any suitable type of gesture. Detected user input may be used in combination with a specific object association. For example, a user touching an item with two fingers out may have a specific interaction event property. In some implementations this could be different from a user gesturing two fingers out in one hand and touching the item with the other hand.

Figure 10:
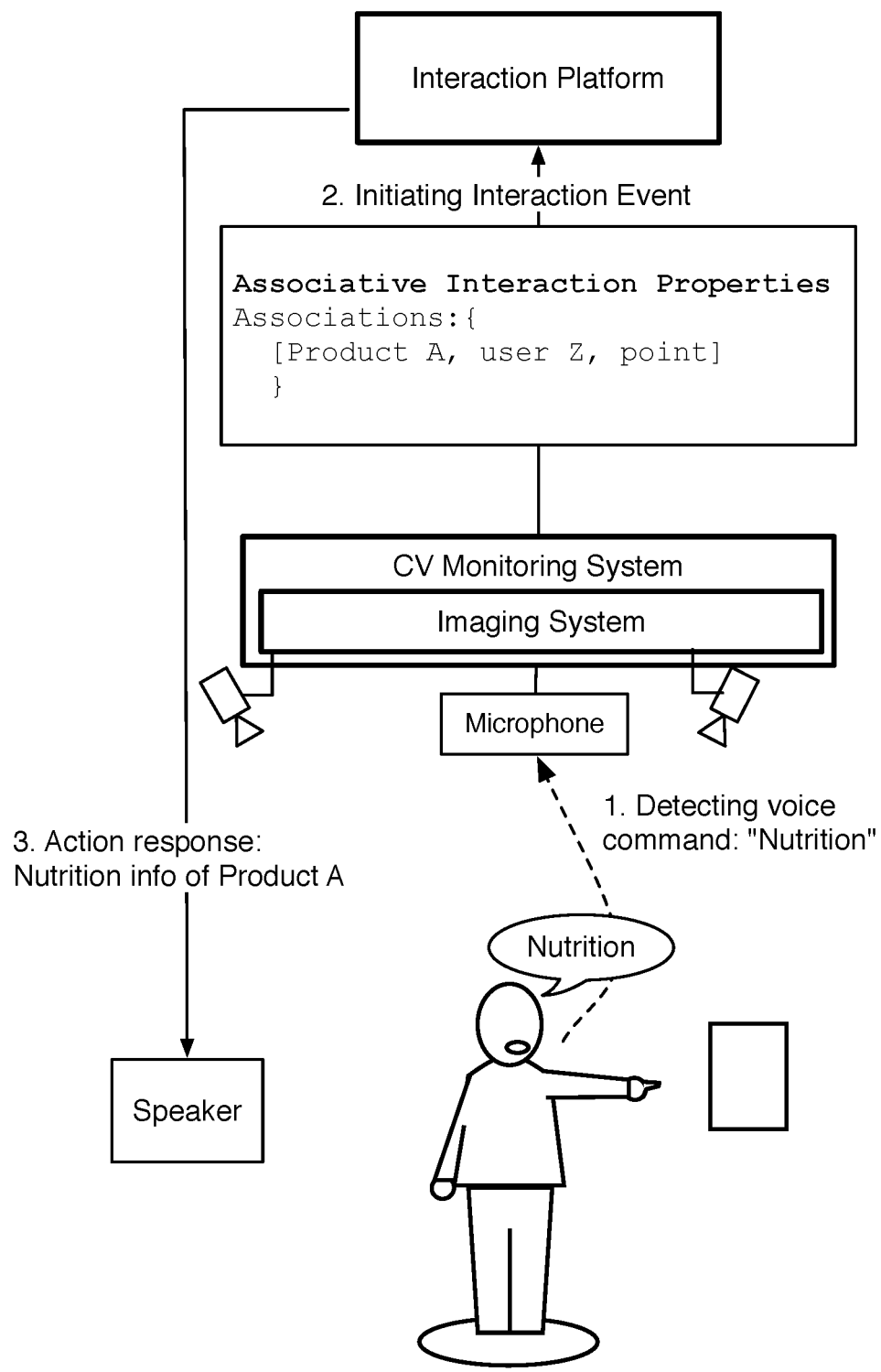
FIG. 10 is a schematic representation of an exemplary implementation of incorporating voice-based user input into associative interaction events.

In another variation, detecting the user input can include recording audio and detecting a voice command in the audio as the user input as shown in FIG. 10. A microphone of a user device or a site-installed device may record the audio. In this way, a user may issue verbal or audible commands in coordination with establishing object associations.

Different stages of the interaction event may be triggered as individual events. This can further expand the adaptability of building unique digital experiences on the associative interaction framework. For example, block S130 may include generating an associative interaction began event, generating an associative interaction modifier change event, generating an associative interaction end event, and/or generating an associative interaction cancel event. For example, a digital experience may initiate some audio or visual signal that an associative interaction is engaged but not finalized, which can function to enable the user to modify, commit, or cancel the interaction. This can be used to give the user's more control and allow accidental interactions to be appropriately resolved.

Detecting associative interaction events is preferably performed for at least one user. More preferably, the process of detecting an associative interaction is executed simultaneously for at least a subset of users detected in the environment. Interaction events can preferably occur independent of other users and with any suitable overlap of the events. The resulting actions are also preferably isolated to digital experiences of the associated user. For example, a first customer performing an associative interaction will have that event alter the digital experience of just the first user, while a second customer performing a second associative interaction will have that event alter the digital experience of just the second customer. Though the actions could similarly be used to perform some action in connection to a second user.

Block S140, which includes executing an action response based on the associative interaction event, functions to respond to the triggered event. Block S140 can involve altering the state of at least one computing device based on the associative interaction properties in association with the one user communicatively coupled to the environment monitoring system. This computing device may be a component of the interaction platform, a user computing device, a computing device in the environment, or any suitable computing device.

As one preferred type of action response, information may be conveyed visually, through audio, or in any suitable format. Information delivery can be used so that users can more easily retrieve information around the items in the environment. Another preferred type of action response includes performing some transaction or change in a computing system. This may be used to update a data structure, initiate some second interaction (e.g., making an order), or performing any suitable change. Other types of actions may also be configured.

The action response is preferably based on the interaction properties. The action response may be explicitly specified through the properties of the interaction event. Alternatively, the interaction platform or a suitable managing system may evaluate the interaction event and appropriately initiate a corresponding response. As described above, various event notifications may be triggered. Different methods could watch or attach these events so that they execute during the event occurrence. The response may include no action, a single action, or multiple actions.

As a first variation, executing an action response can include performing internal updates within the interaction platform. Executing an action response in this variation may include sending a communication to a remote server such as to an interaction cloud platform or local computing system. This action may be performed transparent to the user. For example, associative interactions with a set of products may be used in transparently adding the products to a "recently viewed" list for the associated user.

Figure 11:
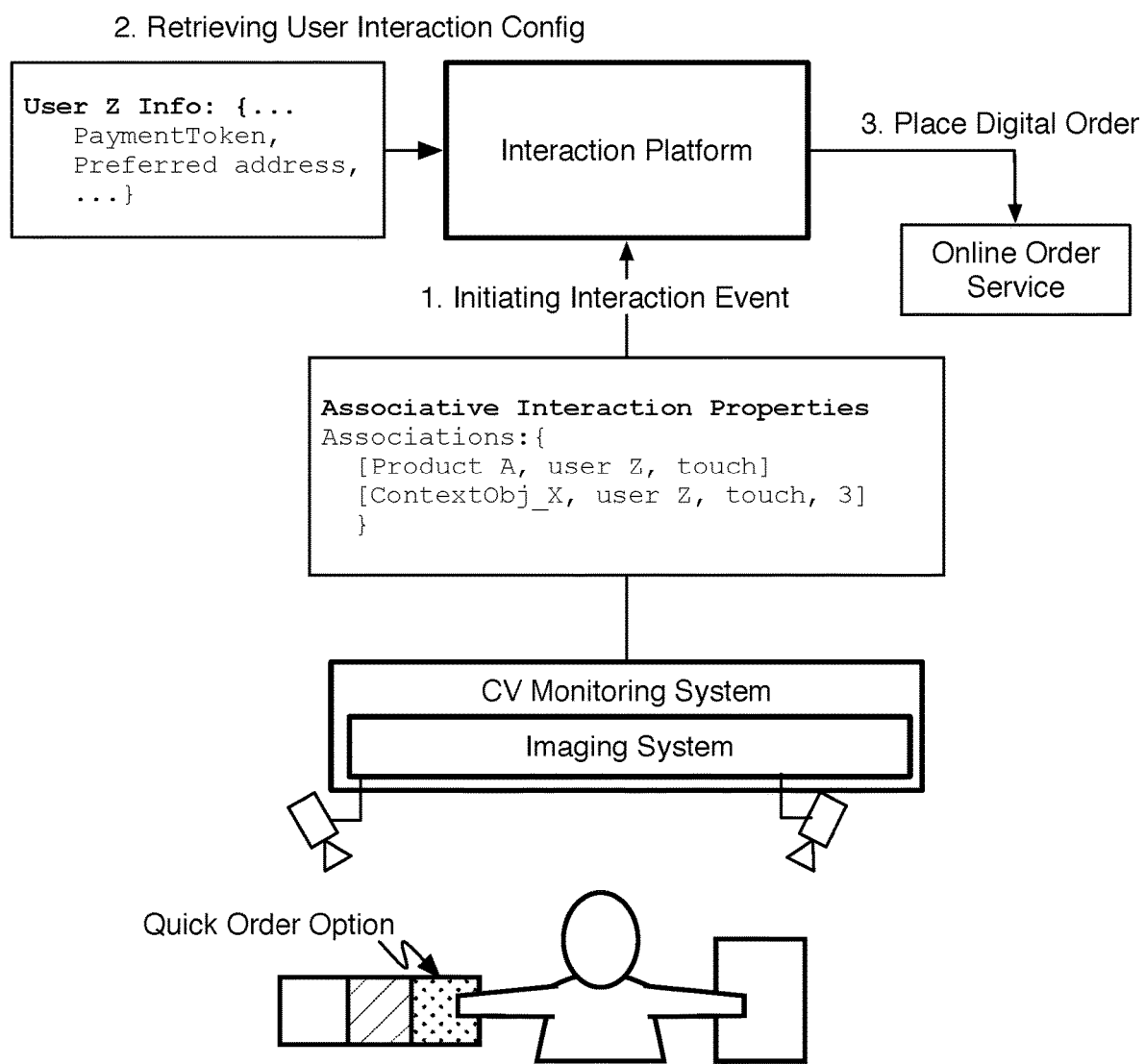
FIG. 11 is a schematic representation of an exemplary implementation using a context-loaded object to direct the automatic digital order of a product.

In a commerce-based environment, an internal system action can be used to place a digital order through physical interactions in a store. In one implementation, a user can pre-configure their account with user interaction configuration that includes a payment mechanism and a default shipping address. When the user performs an appropriate associative interaction involving a product, the action can be placing an order in the internal system. More specifically, executing the action response can include automatically placing a delivery order for the product, wherein shipping information and payment information is specified through the user interaction configuration as shown in FIG. 11.

Figure 12:
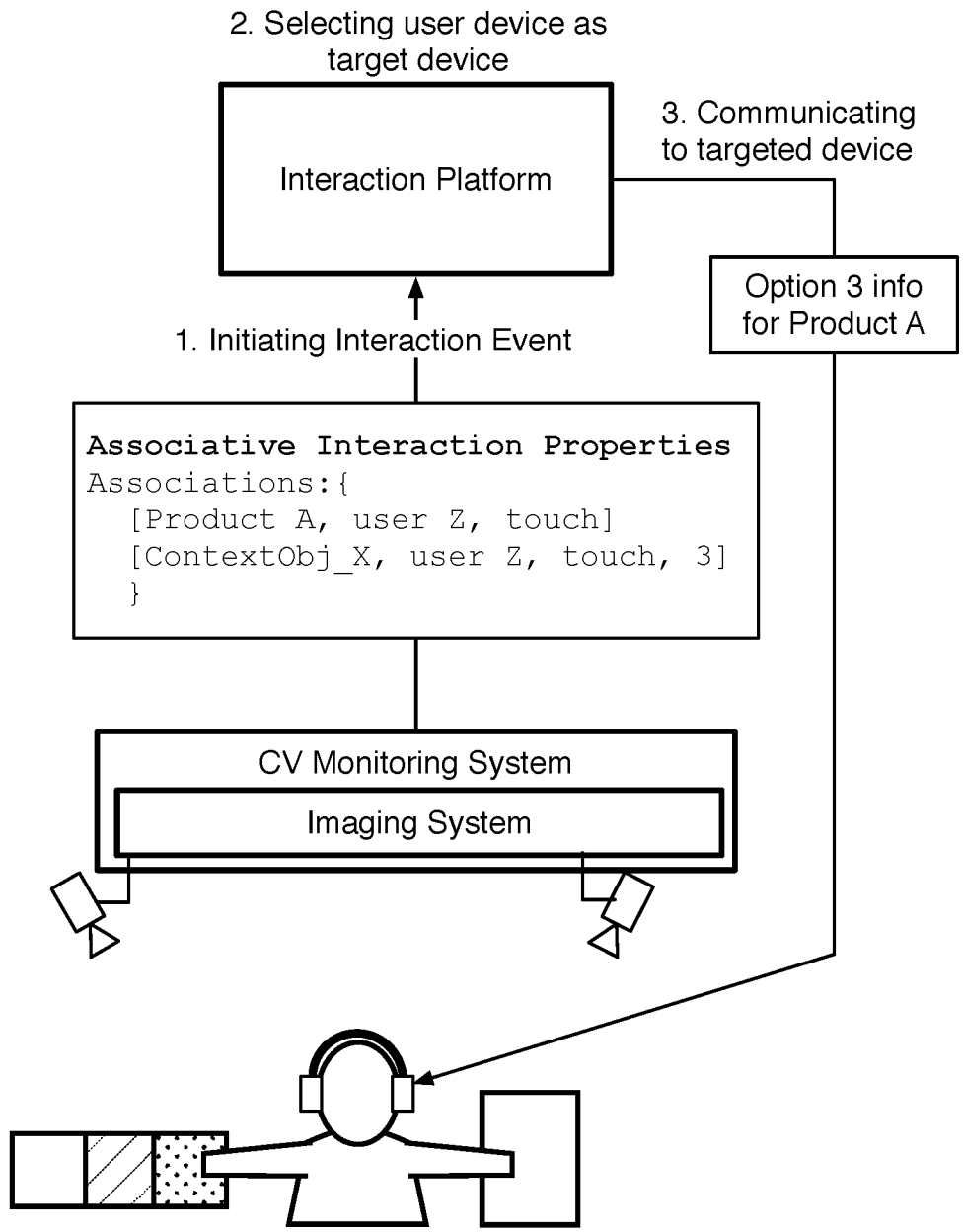
FIG. 12 is a schematic representation of an exemplary implementation of communicating with a user device.

As another variation, executing an action response based on the associative interaction event comprises communicating the action response from the interaction platform to the targeted computing device. In some variations, the targeted device may an active object involved in the associative interaction event. In other cases, a suitable target device as a destination for carrying out the action may have to be identified. In this variation, executing the action response can include selecting a target device, communicating the action response to the target device and executing, performing, or otherwise carrying out the action response at the target device as shown in FIG. 12.

Selecting a target device functions to identify the appropriate device for a particular user. In one variation, selecting a target device includes selecting a user device for the associated user. An application ID or device ID is preferably associated with a user account and used in addressing the notification. If the user has a registered computing device (e.g., a device with the appropriate application installed and linked to their user account), then that device can be selected as a target for the action response. As an example, this can be used in updating an application to reflect the occurrence of the event. The application or device may have logic to process and interpret the associative interaction. When the personal computing of a user is a phone, block S140 may direct actions on the device such as displaying information, playing audio, initiating an alert/notification, executing some action within the phone, provide tactile feedback, or performing any suitable action. When the personal computing device is a smart watch, similar actions may be initiated on the device. When the personal computing device are connected headphones, block S140 preferably directs actions such as playing audio, initiating tactile feedback, initiating recording, or other suitable actions. When the personal computing device is a pair of smart glasses, block S140 may direct actions on the device like the phone including presenting an augmented or virtual reality rendering (e.g., presenting information) or performing any other suitable action.

Figure 8:
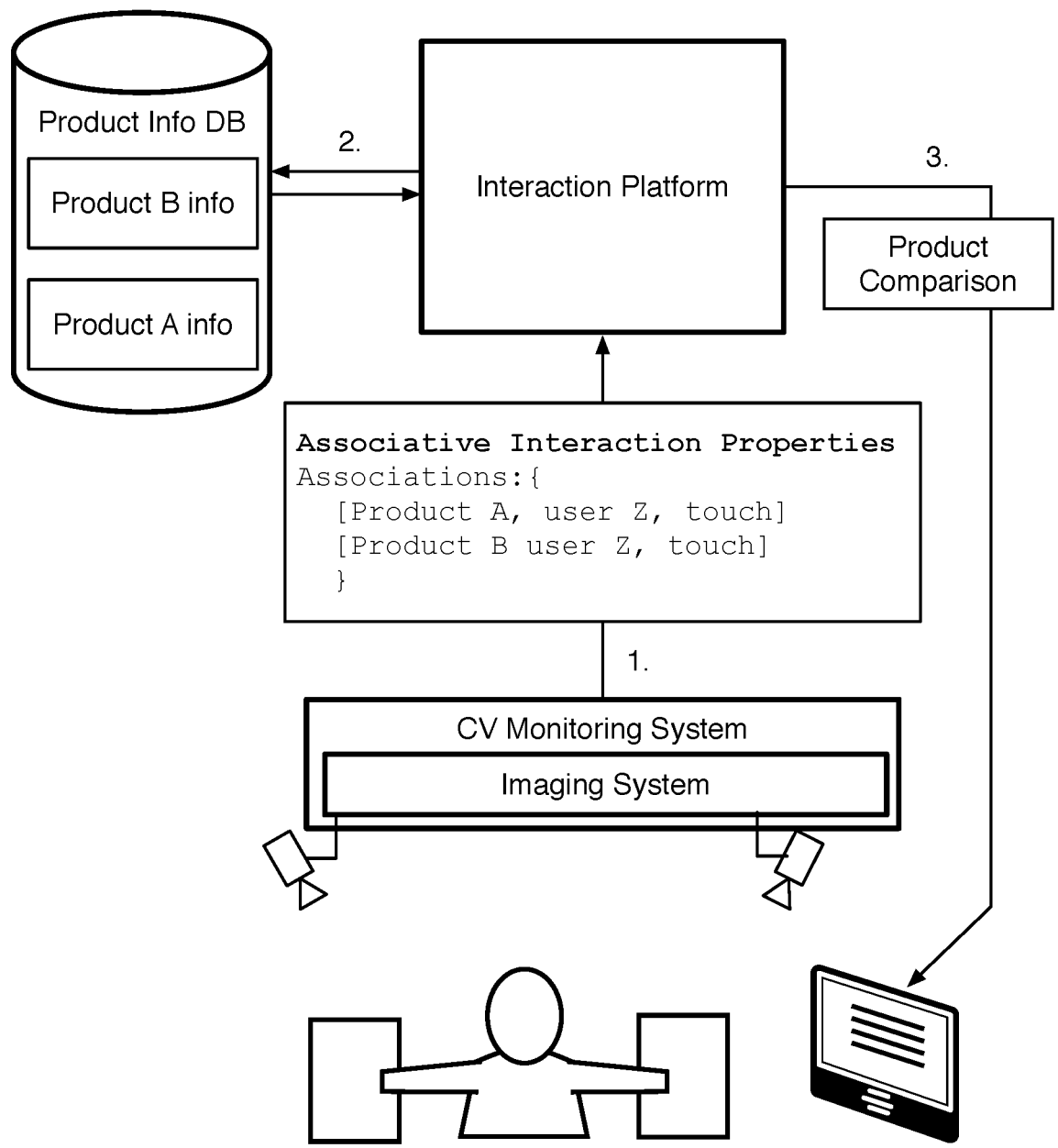
FIG. 8 is a schematic representation of an exemplary implementation using a personal device to supply user input and to receive interaction feedback.

In another variation, selecting a target device can include selecting a site-installed device that satisfies a user feedback proximity condition as shown in FIG. 8. In one variation, the user feedback proximity condition is based on distance from the user to the device. The condition may additionally evaluate a user's direction of attention, visibility, proximity of other users, and/or other suitable factors. A site-installed device can include a display, a speaker, a computing kiosk, or other suitable devices. For example, this could be used in displaying item price check and a virtual cart total on a "price check" display installed in the store. The site-installed device can be an active device involved in the interaction. For example, destination device could be a display device that the user tapped. Alternatively, it could be a device detected to be in the vicinity of the user. The site-installed device may alternatively not be considered a potential active device. For example, a speaker may be out of reach of the user and out of view of the user and therefore not an active object.

Upon selecting a target device, a communication is preferably transmitted to the targeted device. The communication may include the interaction properties, an instruction, or any suitable data. The target device can perform one or more actions based in response to the communication.

Preferably, the communication to the device is used to relay information to the user. The communication may include a message, an image, or any suitable media or instruction to present media. The associative interaction framework can enable the type of information to be controlled by the user in a variety of ways. In one variation, a user can customize their experience to their particular desires. Preferably, a user can set user interaction configuration to select various options. Detecting an associative interaction event may include accessing user interaction configuration that specifies at least one category of a set of categories of information; and wherein executing the action comprises outputting object information corresponding to the user interaction configuration. For example, a user may select what type of information they want delivered for different types of associative interaction events. One user may want to receive pricing information while another user may configure their account to receive nutritional information.

As shown in the exemplary scenario of FIG. 2A, a single object associative interaction may involve a user touching a product. For general objects such as products in a store this form of associative interaction may add the touched product to a "product history" for the user. In another variation, establishing an object association with a single product may add the product to a list like a wishlist, an "order later" list, or categorize the product in any suitable manner. Other actions could similarly be used. In more specialized objects such a single object associative interaction may trigger an object specific event. For example, touching a context-loaded object that signifies "service request" may trigger a notification to a worker to assist a customer.

As shown in the exemplary scenario of FIG. 2B, a multi-object associative interaction may involve a user touching two products simultaneously. In one implementation this may trigger product comparison through a connected interface such as a connected speaker/headphones or a display as described above. For example, in holding up two products a product comparison could be presented as, "The product in your right hand is the better purchase by price but the product in your left hand is more highly recommended and has lower sodium content". FIG. 2b, shows the associative interaction as touching with each hand but may additionally include touching two objects in one hand, using a user's feet/legs in touching an object, holding an object in a user associated object (e.g., a basket/bag). Multi-object associative interactions can similarly be modified through user interaction modifiers, contextually loaded objects, user associated data, and/or other factors. As shown in the exemplary scenario of FIG. 2C, an associative interaction may involve a user with preconfigured preference for nutritional information. When the user touches two products, the product comparison may default to providing a nutritional comparison.

Figure 3B:
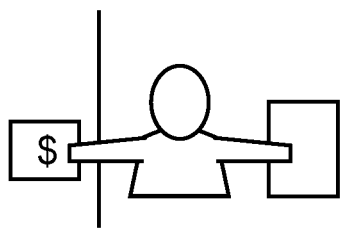

Contextually loaded objects may also be used in other forms of associative interactions. As shown in the exemplary scenario of FIG. 3B, associative interaction may involve a user touching one product and a second contextually loaded object like a pricing request decal. In this example, a price check can be executed for the product and presented through a connected interface. In another variation, the contextually loaded object could be an "order" decal, and this may be used to add the product to an order such as a home delivery order. This may function to enable a customer to shop "on-line" from within a store.

Figure 3C:
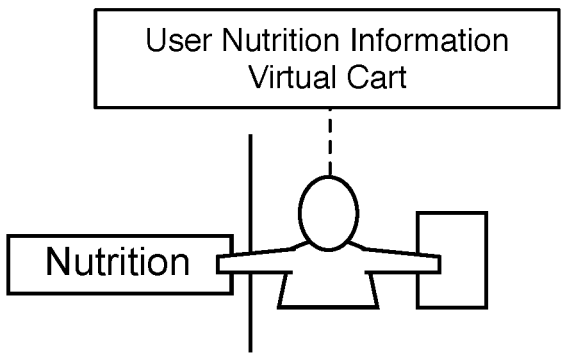

In some cases, user data may be used in combination with contextually loaded objects. As shown in the exemplary scenario of FIG. 3C, an associative interaction may involve a user with preconfigured nutritional information (e.g., allergies, food restrictions, nutritional goals, etc.) and an associated virtual cart. When the user touches a product and a nutrition decal, this could trigger the presentation of nutrition facts relevant to the user and/or nutrition facts in the context of the cart. For example, a connected display or audio interface could inform the user how that product impacts the cumulative nutritional value of their cart.

Figure 3D:
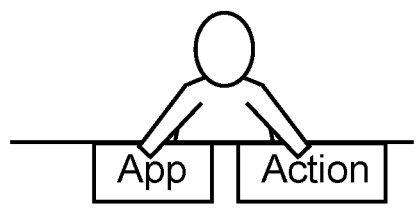

In another variation, contextually loaded objects may be used in combination to perform more complex forms of user input. As shown in the exemplary scenario of FIG. 3D, an associative interaction may involve detecting a user touching two contextually loaded objects: a control action decal and an application decal. This can trigger the relevant control action on the specified application.

As shown in the exemplary scenario of FIG. 5, an associative interaction may involve a user performing some modifying gesture when touching a product. For example, the user could selectively hold out one, two, or three fingers to trigger different actions. In one implementation, no gestures will default to providing a price check, one finger will trigger a nutritional check, two fingers can trigger similar product recommendations, and three fingers can add the item to a wishlist.

Figure 4B:
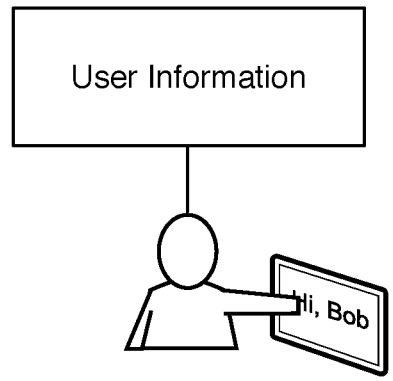

Associative interactions could additionally result in particular events when used with active objects. As shown in the exemplary scenario of FIG. 4B, an associative interaction may involve a user touching a connected store display. This may trigger the display of user-associated information like the user's current cart contents, profile information, and/or other information. In a multi-object variation as shown in FIG. 4A, a user may touch a display and a product, which can trigger the display of product related information.

Figure 4C:
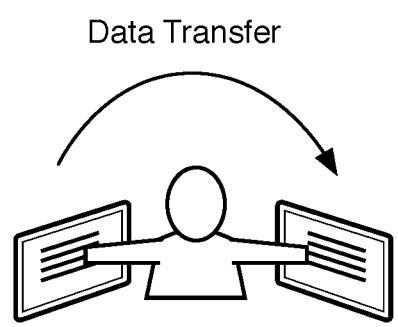

As one particular example shown in FIG. 4C, an associative interaction may involve a user touching two different active objects. This may trigger some interaction between the two active objects. For example, this may result in the synchronization or communication of data between the two devices.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for an interaction framework used for user input within an interaction platform used in an environment, the method comprising: collecting image data in the environment; through computer vision analysis of the image data, classifying objects in the environment wherein a plurality of the objects are detected users; for at least one user, detecting an associative interaction event, which comprises: through computer vision analysis of the image data, detecting a first user gesture establishing a first object association of the one user with a first product in the environment, detecting a second user gesture of the one user, the second user gesture occurring simultaneous to the first user gesture;

and executing an action response triggered at the time of the associative interaction event and based on a set of interaction properties of the associative interaction event, the set of interaction properties including properties of the one user, the first object association, and the second user gesture, wherein the executing the action response comprises altering state of at least one computing device, wherein detecting the associative interaction event for the one user comprises recording audio and detecting a voice command in the audio as user input during the associative interaction event, wherein the set of interaction properties further includes the user input of the voice command.

2. The method of claim 1, wherein collecting image data comprises collecting image data from a plurality of imaging devices that are distributed across the environment, wherein at least a subset of the image data is collected from imaging devices with an aerial perspective.

3. The method of claim 2, further comprising detecting distinct associative interaction events is simultaneously for a plurality of users detected in the environment.

4. The method of claim 1, wherein detecting the second user gesture of the one user comprises detecting the second user gesture and establishing a second object association of the one user with a second object; and wherein the set of interaction properties further includes properties of the second object.

5. The method of claim 4, wherein the first object is an active object that is in communication with the interaction platform.

6. The method of claim 5, further comprising wherein the set of interaction properties are set in part based on data of the active object that is communicated to the interaction platform.

7. The method of claim 5, wherein executing the action response further comprises communicating the action response from the interaction platform to an active device, wherein altering state of at least one computing device alters state of the active device.

8. The method of claim 4, wherein the second object is a second product within the environment.

9. The method of claim 8, wherein executing the action response comprises generating a comparison of at least one product attribute of the first product and the second product and presenting the comparison through an output device in proximity to the user.

10. The method of claim 1, wherein detecting the second user gesture of the one user comprises detecting a graphical marker and user interaction with the graphical marker, wherein the graphical marker is a context-loaded object, wherein a property of the second user gesture used for the action response is an identity of the graphical marker.

11. The method of claim 10, wherein detecting the second user gesture further comprises visually detecting state of interaction with the context-loaded object and adding the detected state to the set of interaction properties.

12. The method of claim 1, detecting the first user gesture comprises detecting contact with the first product with a first hand of the one user, and detecting the second user gesture comprises detecting an action performed by the one user.

13. The method of claim 12, wherein detecting the second user gesture comprises detecting a hand gesture mapped to a modifier property.

14. The method of claim 1, wherein detecting the associative interaction event further comprises accessing user interaction configuration that specifies at least one category of a set of categories of information; and wherein executing the action response comprises outputting object information corresponding to the user interaction configuration.

15. The method of claim 1, wherein executing the action response comprises automatically placing a delivery order for the first product, wherein shipping information and payment information is specified through user interaction configuration associated with the one user.

16. The method of claim 1, wherein executing the action response further comprises selecting a target device, communicating the action response to the target device, and executing the action response at the target device.

17. The method of claim 1, wherein executing the action response further comprises selecting a site-installed device satisfying a user feedback proximity condition and communicating with the site-installed device.

18. A method for an interaction framework used for user input in a store environment comprising: collecting image data from a plurality of imaging devices that are distributed across an environment; through computer vision analysis of the image data, tracking a plurality of users; classifying objects in the store environment wherein at least a subset of the objects are products for sale in the environment; for at least one user, detecting an associative interaction event performed by the one user, which comprises: through computer vision analysis of the image data, detecting a first user gesture establishing a first object association of the one user with a first product in the environment, through computer vision analysis of the image data, detecting a second user gesture establishing a second object association of the one user with a second object, the second user gesture occurring simultaneous to the first user gesture, wherein properties of the one user, the first object association, and the second object association form a set of interaction properties; and altering the state of at least one computing device triggered by the associative interaction event and based on the set of interaction properties in association with the one user, wherein detecting the associative interaction event for the one user comprises recording audio and detecting a voice command in the audio as user input during the associative interaction event, wherein the set of interaction properties further includes the user input of the voice command.

19. A system for an interaction framework used for user input within an interaction platform used in an environment comprising: a computer vision monitoring system that includes a plurality of imaging devices distributed at distinct locations across an environment, wherein at least a subset of imaging devices are mounted in an aerial location; wherein the computer vision monitoring system is further configured to: collect image data, classify objects in the environment which includes detection of a set of users that are present in the environment, for at least one user, detect a first user gesture establishing a first object association between the user and a first product in the environment, detect a second user gesture and establish a second object association between the user and a second classified object, the second user gesture being detected simultaneous to the first user gesture, and initiate an associative interaction event with a set of interaction properties, which include properties of the first product, the second classified object, and the one user; and an interaction platform configured to initiate execution of an action response when triggered by to the associative interaction event with at least one computing device, the action response being based on the set of interaction properties, wherein detecting the associative interaction event for the one user comprises recording audio and detecting a voice command in the audio as user input during the associative interaction event, wherein the set of interaction properties further includes the user input of the voice command.

* * * * *